US012288320B2

(12) United States Patent
Knight et al.

(10) Patent No.: US 12,288,320 B2
(45) Date of Patent: Apr. 29, 2025

(54) EXPERIMENTAL SET UP FOR STUDYING TEMPERATURE GRADIENT DRIVEN CRACKING

(71) Applicant: University of South Carolina, Columbia, SC (US)

(72) Inventors: Travis Knight, Blythewood, SC (US); Sobhan Patnaik, Columbia, SC (US); Theodore Besmann, Oak Ridge, TN (US); Elwyn Roberts, Lugoff, SC (US)

(73) Assignee: University of South Carolina, Columbia, SC (US)

( * ) Notice: Subject to any disclaimer, the term of this patent is extended or adjusted under 35 U.S.C. 154(b) by 225 days.

(21) Appl. No.: 17/506,928

(22) Filed: Oct. 21, 2021

(65) Prior Publication Data

US 2022/0198649 A1    Jun. 23, 2022

Related U.S. Application Data

(60) Provisional application No. 63/129,085, filed on Dec. 22, 2020.

(51) Int. Cl.
| G01N 21/88 | (2006.01) |
| G01J 5/00 | (2022.01) |
| G01N 25/20 | (2006.01) |
| G01N 25/72 | (2006.01) |
| G06T 7/00 | (2017.01) |
| G21C 3/62 | (2006.01) |

(52) U.S. Cl.
CPC ............ *G06T 7/0006* (2013.01); *G01N 21/88* (2013.01); *G01N 21/8803* (2013.01); *G01N 25/20* (2013.01); *G01N 25/72* (2013.01); *G21C 3/623* (2013.01); *G01J 2005/0077* (2013.01); *G06T 2207/30132* (2013.01)

(58) Field of Classification Search
CPC ........ G01N 25/72; G01N 21/88; G01N 25/00; G01J 2005/0077
See application file for complete search history.

(56) References Cited

U.S. PATENT DOCUMENTS 6,171,511 B1    1/2001   Charollais et al.

FOREIGN PATENT DOCUMENTS

| CN | 107871540 A | * | 4/2018 | |
| FR | 2988974 A1 | * | 10/2013 | ............. G21C 17/06 |
| WO | WO-2014028731 A1 | * | 2/2014 | ............. G21C 21/02 |

* cited by examiner

*Primary Examiner* — Mirellys Jagan
(74) *Attorney, Agent, or Firm* — Offit Kurman; Douglas L. Lineberry

(57) ABSTRACT

Described herein are systems and methods for imaging the top surface of a fuel pellet to observe the formation of radial cracks employing resistive heating to volumetrically heat the fuel pellet, but instead of passing the current axially through the pellet, electrodes were placed on the sides of a single pellet to pass the current transversely across the pellet allowing for an unobstructed view of the top surface of the pellet.

7 Claims, 39 Drawing Sheets

TABLE I. Specifications of beam splitter.

| | |
|---|---|
| Diameter tolerance | +0, −0.005″ (+0, −0.13 mm) |
| Thickness tolerance | ±0.005″ (±0.13 mm) |
| Clear aperture | 85% |
| Parallelism | 3 arc min |
| Flatness | ¼ waves at 633 nm |
| Surface finish | 40/20 |
| Angle of incidence | 0–45° |
| Coating | Tr 70% for 400–700 nm; Rf 95% for 3–12 $\mu$m |

FIGURE 4

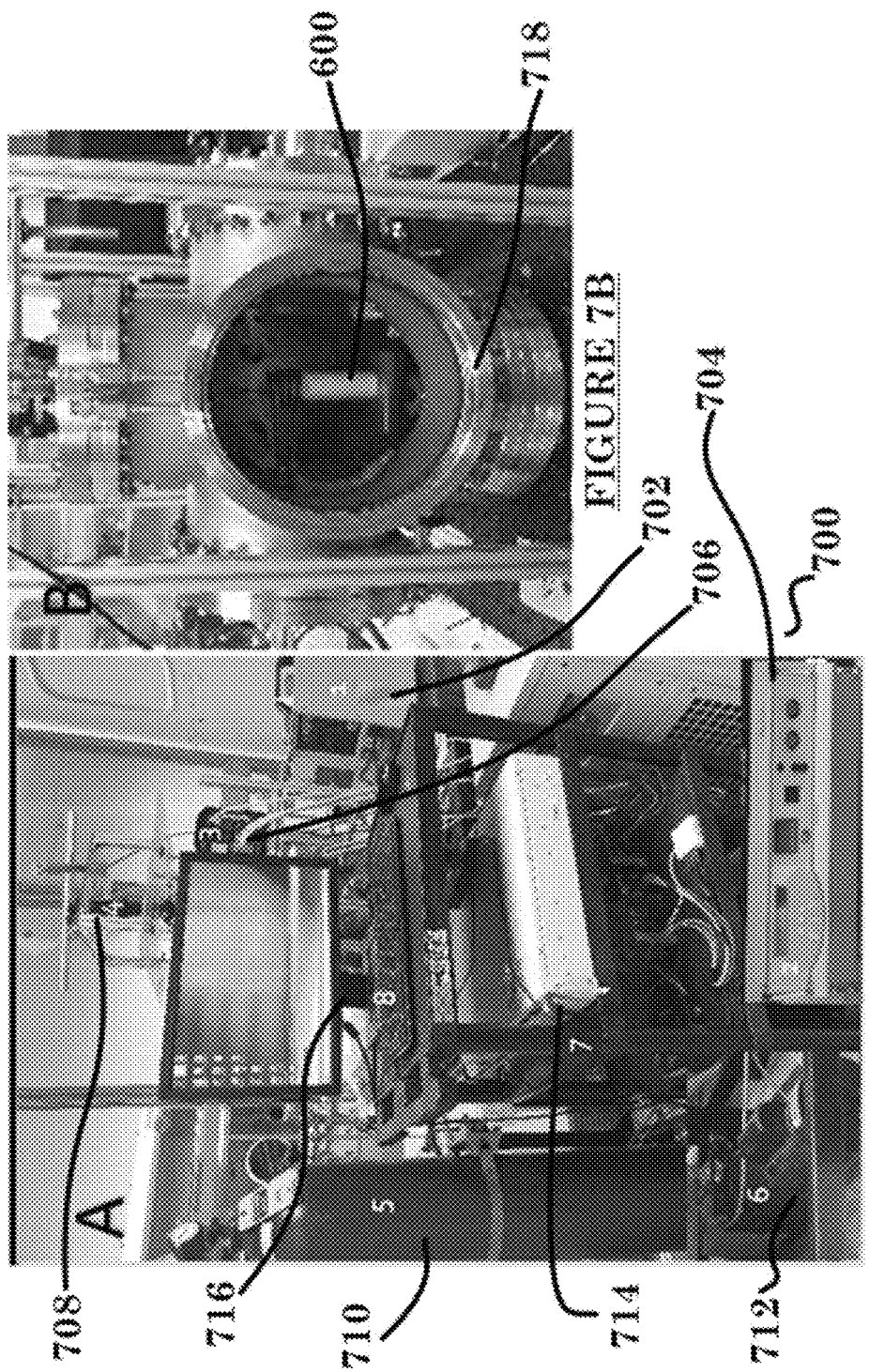

TABLE II. Experimental parameters logged in LabVIEW.

| Parameters | Output units |
|---|---|
| Voltage | Volts (V) |
| Current | Amperes (A) |
| Temperature | Celsius (°C) |
| Vacuum pressure | Volts (V) |
| Optical images | .jpeg with timestamps |
| Cycle and host time | Seconds |

FIGURE 12

TABLE III

Dimensions of Test Stand Assembly

| Test Stand Part Name | Dimensions (cm)[a] |
|---|---|
| Inner BN tube | I.D. = 1.143; O.D. = 1.5494; H = 2.794 |
| Molybdenum susceptor | I.D. = 1.5748; O.D. = 1.905; H = 2.794 |
| Outer BN tube | I.D. = 1.9304; O.D. = 2.2352; H = 2.794 |
| Nickel electrode | 10 × 0.7 × 0.023 |

[a] I.D. = inner diameter; O.D. = outer diameter; H = height.

FIGURE 14

TABLE IV
Peak Current Values and Average Hold Times

| Test Number | Pellet Identifier | Highest Peak Current (A) | Nominal Hold Times at Each Current Level | Induction Heating Times | Hold Times and Current Values for Crack Initiation | Total Time from Beginning of Test Until Cracking |
|---|---|---|---|---|---|---|
| 1 | U3-38 | 4.0 | 42.3 s | 8 s | 22 s at 3.5 A | 111 s |
| 2 | U4-50 | 4.0 | 60.0 s | 8 s | 33 s at 3.5 A | 347 s |
| 3 | U5-45B | 4.0 | 43.0 s | 4 s | 26 s at 3.5 A | 244 s |
| 4 | U1-38A | 5.0 | 35.0 s | 8 s | 30 s at 3.5 A | 217 s |
| 5 | U5-26F | 6.0 | 27.0 s | 10 s | 26 s at 4.0 A | 205 s |
| 6 | U5-22C | 8.0 | 25.0 s | 7 s | 24 s at 4.0 A | 182 s |
| 7 | U5-20C | 8.0 | 22.0 s | 6 s | 2 s at 4.0 A | 146 s |
| 8 | U5-20D | 8.0 | 23.6 s | 9 s | 22 s at 4.0 A | 176 s |

FIGURE 15

TABLE 3
Test Conditions and Pellet Fabrication Details*

| Pellet Identifier | Density | Theoretical Density | Dimensions[a] | Threshold Temperature | Maximum Temperature Attained by Pellet | Radial Temperature Difference Before Cracking | Radial Temperature Difference After Cracking | Cracking Patterns |
|---|---|---|---|---|---|---|---|---|
| U3-38 | 10.52 g/cm³ | 95.86% | D = 11.01 mm; H = 9.14 mm | 400°C | 1660°C | $\Delta T_{horiz}^* = 310°C$; $\Delta T_{vert}^* = 485°C$ | $\Delta T_{horiz}^* = 241°C$; $\Delta T_{vert}^* = 196°C$ | Radial cracks across the pellet, radial branching |
| U4-50 | 10.31 g/cm³ | 94% | D = 10.96 mm; H = 8.73 mm | 450°C | 1730°C | $\Delta T_{horiz}^* = 190°C$; $\Delta T_{vert}^* = 240°C$ | $\Delta T_{horiz}^* = 196°C$; $\Delta T_{vert}^* = 145°C$ | Radial cracks across the pellet, radial branching |
| U5-45B | 10.36 g/cm³ | 94.45% | D = 10.95 mm; H = 9.33 mm | 460°C | 1700°C | $\Delta T_{horiz}^* = 230°C$; $\Delta T_{vert}^* = 280°C$ | $\Delta T_{horiz}^* = 200°C$; $\Delta T_{vert}^* = 160°C$ | Radial cracks across the pellet, radial branching |
| U1-38A | 10.37 g/cm³ | 94.49% | D = 10.93 mm; H = 9.31 mm | 330°C | 1800°C | $\Delta T_{horiz}^* = 155°C$; $\Delta T_{vert}^* = 205°C$ | $\Delta T_{horiz}^* = 176°C$; $\Delta T_{vert}^* = 145°C$ | Radial cracks across the pellet, radial branching |
| U5-26F | 10.37 g/cm³ | 94.5% | D = 10.98 mm; H = 9.29 mm | 450°C | 1860°C | $\Delta T_{horiz}^* = 235°C$; $\Delta T_{vert}^* = 280°C$ | $\Delta T_{horiz}^* = 354°C$; $\Delta T_{vert}^* = 281°C$ | Radial cracks across the pellet |
| U5-22C | 10.31 g/cm³ | 93.96% | D = 10.97 mm; H = 9.32 mm | 550°C | 2100°C | $\Delta T_{horiz}^* = 165°C$; $\Delta T_{vert}^* = 215°C$ | $\Delta T_{horiz}^* = 180°C$; $\Delta T_{vert}^* = 109°C$ | Radial cracks across the pellet, radial branching |
| U5-20C | 10.27 g/cm³ | 93.63% | D = 10.98 mm; H = 9.34 mm | 580°C | 2100°C | $\Delta T_{horiz}^* = 122°C$; $\Delta T_{vert}^* = 190°C$ | $\Delta T_{horiz}^* = 205°C$; $\Delta T_{vert}^* = 140°C$ | Radial cracks across the pellet, radial branching |
| U5-20D | 10.23 g/cm³ | 93.28% | D = 11.01 mm; H = 9.32 mm | 680°C | 2100°C | $\Delta T_{horiz}^* = 206°C$; $\Delta T_{vert}^* = 260°C$ | $\Delta T_{horiz}^* = 214°C$; $\Delta T_{vert}^* = 135°C$ | Radial cracks across the pellet |

*$\Delta T_{horiz}^*$ = temperature difference along the line profile drawn between the electrodes. $\Delta T_{vert}^*$ = temperature difference along the line profile drawn perpendicular to the horizontal line across the nonelectrode side.
[a] D = diameter; H = height.

FIGURE 16

TABLE VI

Current Across Surfaces of the Samples

| Test Number | Current (A)[a] | |
| --- | --- | --- |
| | Pellet U5-26D | Pellet U4-53D |
| 1 | 5.30E-06 | 3.07E-06 |
| 2 | 3.39E-06 | 5.13E-06 |
| 3 | 7.84E-06 | 4.01E-06 |
| 4 | 7.12E-06 | 2.03E-06 |
| 5 | 7.88E-06 | 4.00E-06 |
| Average | 6.31E-06 | 3.65E-06 |

[a]Each test averaged 30 s.

FIGURE 35

TABLE VII

Measured UO$_2$ Electrical Resistivity

| Sample identifier<br>Dimensions (cm)[a] | US-26D<br>D = 1.09<br>H = 0.91 | U4-53D<br>D = 1.10<br>H = 0.93 | Bates et al.[15]<br>D = 0.63<br>H = 1.9 |
|---|---|---|---|
| Fabrication conditions | 1790°C for 24 h,<br>Ar-5% H$_2$ | 1790°C for 24 h,<br>Ar-5% H$_2$ | Sintered in commercial-grade H$_2$ at 1700 C for 12 h; heat treated for 8 to 12 h at 1125 K in purified Ar-8% H$_2$ |
| Theoretical density | 94.15% | 93.4% | 100% |
| Resistance, $R$ (Ω) | $1.58 \times 10^6$ | $2.74 \times 10^6$ | $1.38 \times 10^6$ |
| Resistivity, $\rho$ (Ω·cm); $\rho = \frac{A}{H \cdot L} \cdot \frac{V}{I}$ | $2.94 \times 10^6$ | $3.94 \times 10^6$ | $2.30 \times 10^5$ |
| Conductivity (Ω$^{-1}$·cm$^{-1}$); $\sigma = 1/\rho$ | $3.4 \times 10^{-7}$ | $2.54 \times 10^{-7}$ | $4.35 \times 10^{-6}$ |

[a] D = diameter; H = height.

FIGURE 36

| Pellet ID | Density | Theoretical Density | Dimensions (mm) | Threshold Temperature | Peak Temperature Attained by Pellet | Radial Temperature Difference Before Cracking | Radial Temperature Difference After Cracking | Cracking Pattern |
|---|---|---|---|---|---|---|---|---|
| U1.38 | 10.52 g/cc | 95.98% | D = 11.01, H = 9.34 | 400°C | 1660°C | $\Delta T_{max} = 310°C$ $\Delta T_{ave} = 180°C$ | $\Delta T_{max} = 241°C$ $\Delta T_{ave} = 190°C$ | Radial cracks across the pellet, radial branching |
| L4.50 | 10.31 g/cc | 94.08% | D = 10.96, H = 8.73 | 450°C | 1730°C | $\Delta T_{max} = 190°C$ $\Delta T_{ave} = 240°C$ | $\Delta T_{max} = 196°C$ $\Delta T_{ave} = 145°C$ | Radial cracks across the pellet, radial branching |
| U5.45B | 10.36 g/cc | 94.45% | D = 10.92, H = 9.33 | 400°C | 1790°C | $\Delta T_{max} = 235°C$ $\Delta T_{ave} = 230°C$ | $\Delta T_{max} = 208°C$ $\Delta T_{ave} = 169°C$ | Radial cracks across the pellet, radial branching |
| U1.38A | 10.37 g/cc | 94.49% | D = 10.93, H = 9.31 | 330°C | 1810°C | $\Delta T_{max} = 155°C$ $\Delta T_{ave} = 205°C$ | $\Delta T_{max} = 176°C$ $\Delta T_{ave} = 142°C$ | Radial cracks across the pellet |
| U5.28F | 10.37 g/cc | 94.5% | D = 10.98, H = 9.39 | 480°C | 1860°C | $\Delta T_{max} = 235°C$ $\Delta T_{ave} = 300°C$ | $\Delta T_{max} = 355°C$ $\Delta T_{ave} = 281°C$ | Radial cracks across the pellet, radial branching |
| U5.22C | 10.31 g/cc | 93.98% | D = 10.97, H = 9.32 | 550°C | 2100°C | $\Delta T_{max} = 165°C$ $\Delta T_{ave} = 215°C$ | $\Delta T_{max} = 180°C$ $\Delta T_{ave} = 109°C$ | Radial cracks across the pellet |
| U5.20C | 10.27 g/cc | 93.61% | D = 10.94, H = 9.34 | 500°C | 2100°C | $\Delta T_{max} = 122°C$ $\Delta T_{ave} = 190°C$ | $\Delta T_{max} = 198°C$ $\Delta T_{ave} = 140°C$ | Radial cracks across the pellet, radial branching |
| U5.20D | 10.23 g/cc | 93.28% | D = 11.01, H = 9.33 | 600°C | 2100°C | $\Delta T_{max} = 206°C$ $\Delta T_{ave} = 266°C$ | $\Delta T_{max} = 214°C$ $\Delta T_{ave} = 135°C$ | Radial cracks across the pellet |

FIGURE 38

| Test no. | Pellet ID | Highest peak current (A) | Nominal hold times at each current level | Induction Heating Times | Hold times and current values for crack initiation | Total time from beginning of test until cracking |
|---|---|---|---|---|---|---|
| 1 | U3-38 | 4.0 | 42.3 s | 8 s | 22 s at 3.5 A | 111 s |
| 2 | U4-50 | 4.0 | 60.0 s | 8 s | 33 s at 3.5 A | 347 s |
| 3 | U5-45B | 4.0 | 43.0 s | 4 s | 26 s at 3.5 A | 244 s |
| 4 | U1-38A | 5.0 | 35.0 s | 8 s | 30 s at 3.5 A | 217 s |
| 5 | U5-26F | 6.0 | 27.0 s | 10 s | 26 s at 4.0 A | 205 s |
| 6 | U5-22C | 8.0 | 25.0 s | 7 s | 24 s at 4.0 A | 182 s |
| 7 | U5-20C | 8.0 | 22.0 s | 6 s | 2 s at 4.0 A | 146 s |
| 8 | U5-20D | 8.0 | 23.6 s | 9 s | 22 s at 4.0 A | 176 s |

FIGURE 39

EXPERIMENTAL SET UP FOR STUDYING TEMPERATURE GRADIENT DRIVEN CRACKING

STATEMENT REGARDING FEDERALLY SPONSORED RESEARCH

This disclosure was made with government support under DE-NE0008531 awarded by the Department of Energy. The government may have certain rights in the invention.

TECHNICAL FIELD

The subject matter disclosed herein is generally directed to systems and methods for imaging the top surface of a fuel pellet to observe the formation of radial cracks employing resistive heating to volumetrically heat the fuel pellet allowing current to pass transversely across the pellet allowing for an unobstructed view of the top surface of the pellet.

BACKGROUND

The behavior of light water reactor (LWR) fuel is significantly affected by fracture, which is driven by multiple phenomena. Early in the life of fresh fuel, fracture is primarily caused by thermal stresses. The fission process in the cylindrical fuel pellets causes volumetric heating that in conjunction with the forced convective cooling on the exterior of the fuel rod results in a temperature profile with significantly higher values at the fuel centerline than at the fuel exterior, and which has a roughly parabolic shape. This leads to significant tensile stresses in the pellet exterior that result in crack initiation in fresh fuel, even during the initial ramp to power.

Fuel fracture has important implications for fuel performance in normal operating conditions because it affects heat transfer through the fuel and the size of the fuel/cladding gap and can cause increased stresses in the cladding in the vicinity of fuel cracks. It is also of interest for understanding fuel behavior during accident conditions, because in the event of cladding rupture, dispersal of fuel fragments in the coolant is affected by their size.

For fuel performance codes to be predictive under a wide range of operating conditions, it is important for them to faithfully represent all aspects of behavior of the fuel system using physics-based models. Because of its important role on fuel behavior, improving the models for representing fracture has been a high priority in development of the BISON fuel performance code in recent years. Although significant advances have been made in modeling fracture, there is limited data available on the processes of fracture initiation and growth for direct validation of these models.

Developing systems and methods that permit quantification of the process of fracture initiation and growth in LWR fuel is challenging because it is difficult to both replicate the thermal conditions experienced by the fuel in the reactor and instrument the experiment in a way that permits observing crack growth. Accordingly, it is an object of the present disclosure to provide imaging of the top surface of a fuel pellet to observe the formation of radial cracks.

Citation or identification of any document in this application is not an admission that such a document is available as prior art to the present disclosure.

SUMMARY

The current disclosure provides in one embodiment, a method for capturing fracture initiation and growth in fuel pellets. The method may include employing inductive heating to raise a temperature of at least one fuel pellet followed by direct resistance heating, placing electrodes on at least two sides of the at least one fuel pellet to pass current transversely across the at least one fuel pellet, imaging a pellet surface of the at least one fuel pellet to observe crack formation intersecting the pellet surface, and generating at least one temperature profile for the at least one fuel pellet. Further, the fuel pellet may comprise $UO_2$. Still, capture may occur in real time. Yet again, the method may utilize a dual imaging technique wherein at least one infrared camera captures the at least one fuel pellet's temperature gradient while at least one optical camera system captures physical images of the at least one fuel pellet. Moreover, imaging may be performed in situ with respect to the at least one fuel pellet. Further yet, both intergranular and intragranular cracking may be captured. Again, the method may include employing fractography to analyze a shape of at least one fracture in the at least one fuel pellet.

In a further embodiment, the disclosure provides a system for measuring thermal conditions experienced by fuel pellets in situ. The system may include at least one induction heat source, at least one direct resistance heat source, at least one detector for capturing at least one temperature profile of at least one fuel pellet generated from volumetric heating and radial heat rejection with respect to the at least one fuel pellet, and at least one dual imaging system for capturing optical and thermal images from the at least one fuel pellet. Further, the system may include at least one detector for measuring electrical resistivity of the at least one fuel pellet. Again, the fuel pellet may comprise $UO_2$. Still, imaging capture may occur in real time. Again yet, the system may utilize at least one dual imaging system wherein at least one infrared camera may capture the at least one fuel pellet's temperature gradient while at least one optical camera may capture physical images of the at least one fuel pellet. Yet further, booth intergranular and intragranular cracking may be captured. Moreover, the system may employ fractography analysis a shape of at least one fracture in the at least one fuel pellet.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 4 shows Table I, Specifications of Beam Splitter.

FIG. 7A shows one embodiment of a test setup of the current disclosure.

FIG. 7B shows one embodiment of a stainless steel vacuum chamber with the BN test stand of the current disclosure.

FIG. 12 shows Table 2, Experimental Parameter Logged in LabVIEW.

The figures herein are for illustrative purposes only and are not necessarily drawn to scale.

Figure 13:
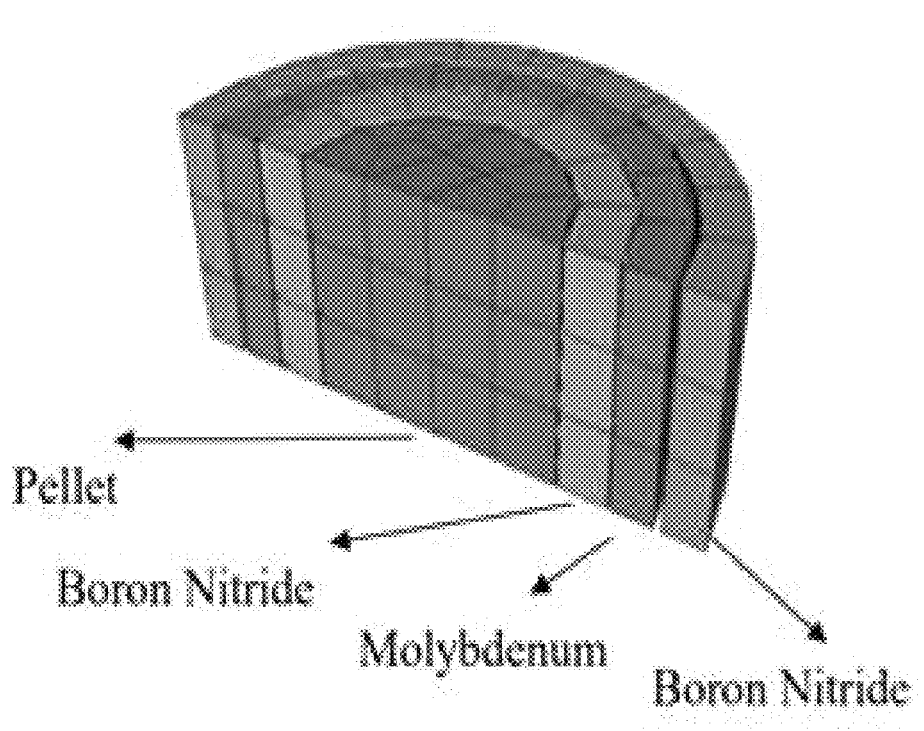

FIG. 13 shows a cross section of a test strand for the current disclosure.

FIG. 14 shows Table III.

FIG. 15 shows Table IV.

FIG. 16 show Table V.

Figure 17:
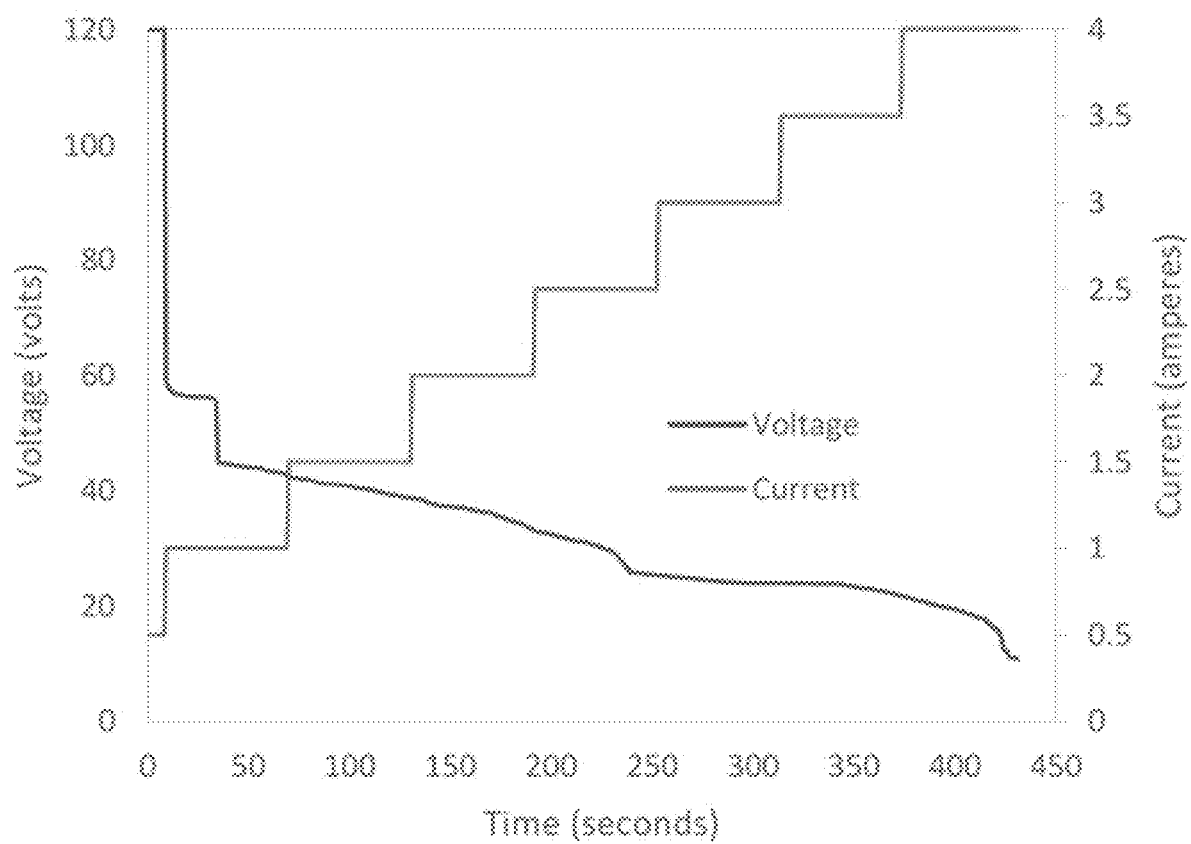

FIG. 17 shows current (secondary y-axis on the right) and voltage (primary y-axis on the left) for the resistive heating of pellet U4-50 as a function of time; the pellet becomes conductive after about 4 s of induction heating.

Figure 18:
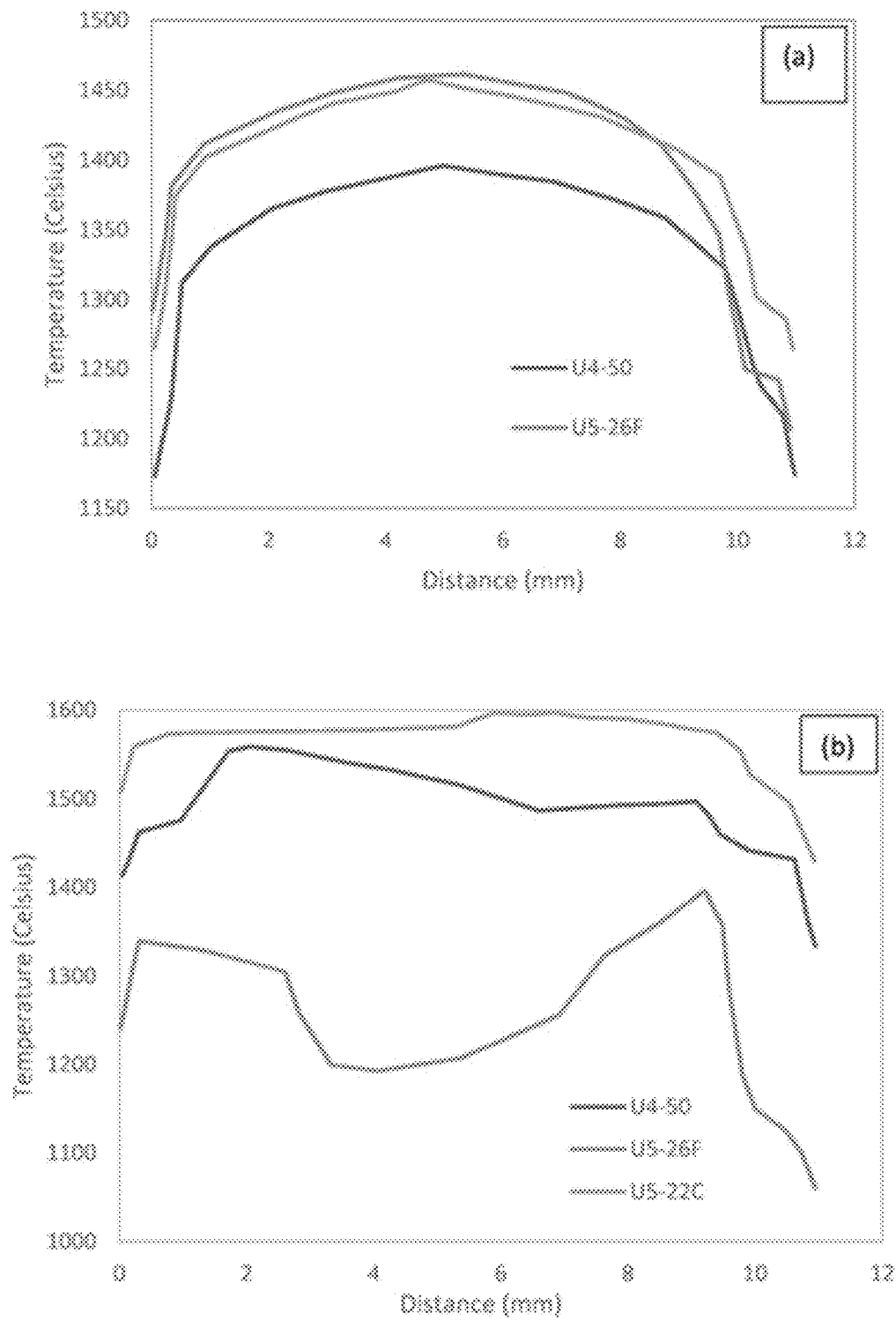

FIG. 18 shows horizontal temperature profiles along the top surfaces of three $UO_2$ pellets at: (a) before and (b) after cracking at low, intermediate, and high peak currents of 4 A, 6 A, and 8 A, respectively: U4-50 (4 A), U5-26F (6 A), and U5-22C (8 A).

Figure 19:
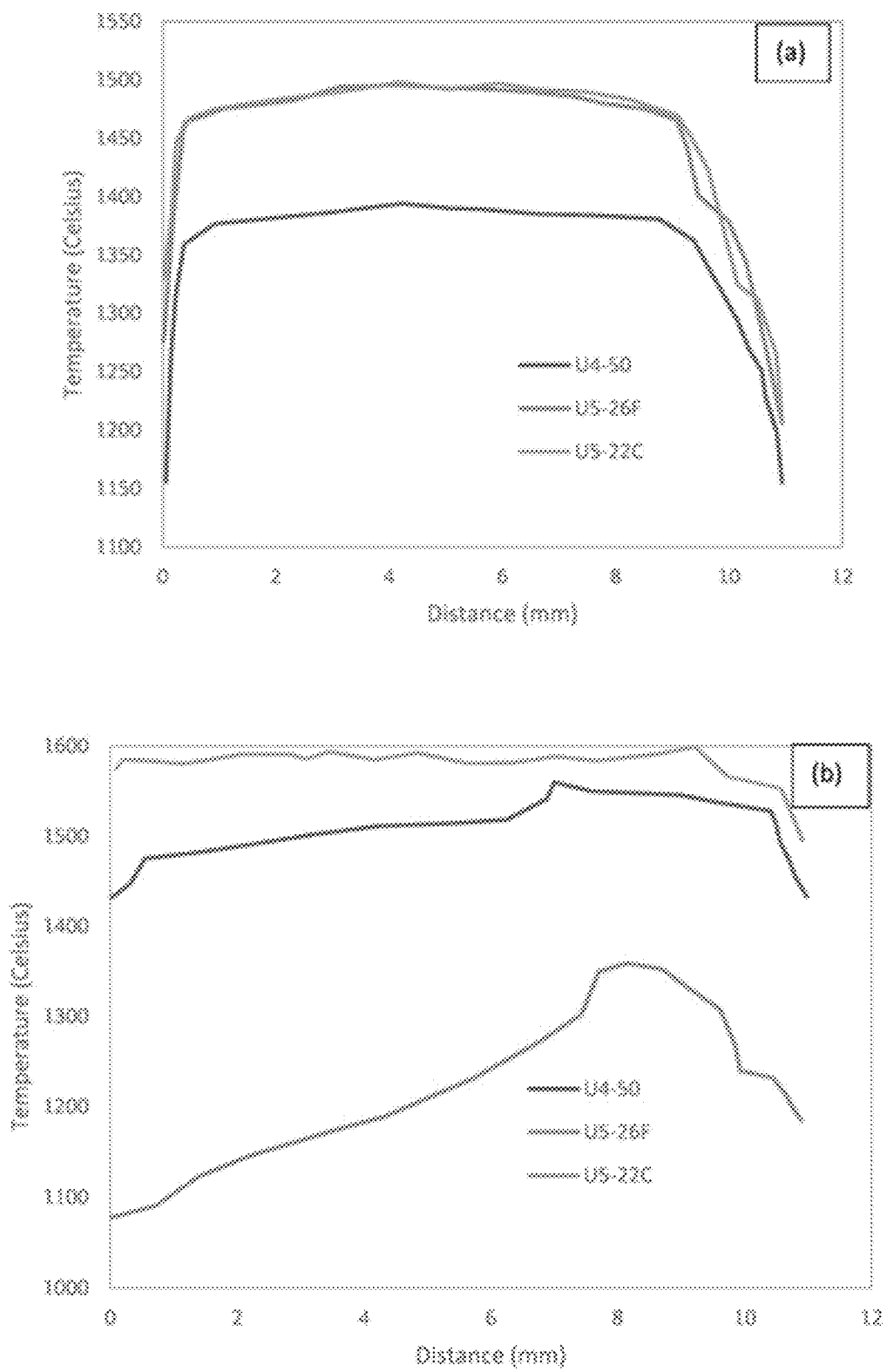

FIG. 19 shows vertical temperature profiles along the top surfaces of three $UO_2$ pellets at: (a) before and (b) after cracking at low, intermediate, and high peak currents of 4 A, 6 A, and 8 A, respectively: U4-50 (4 A), U5-26F (6 A), and U5-22C (8 A).

Figure 20:
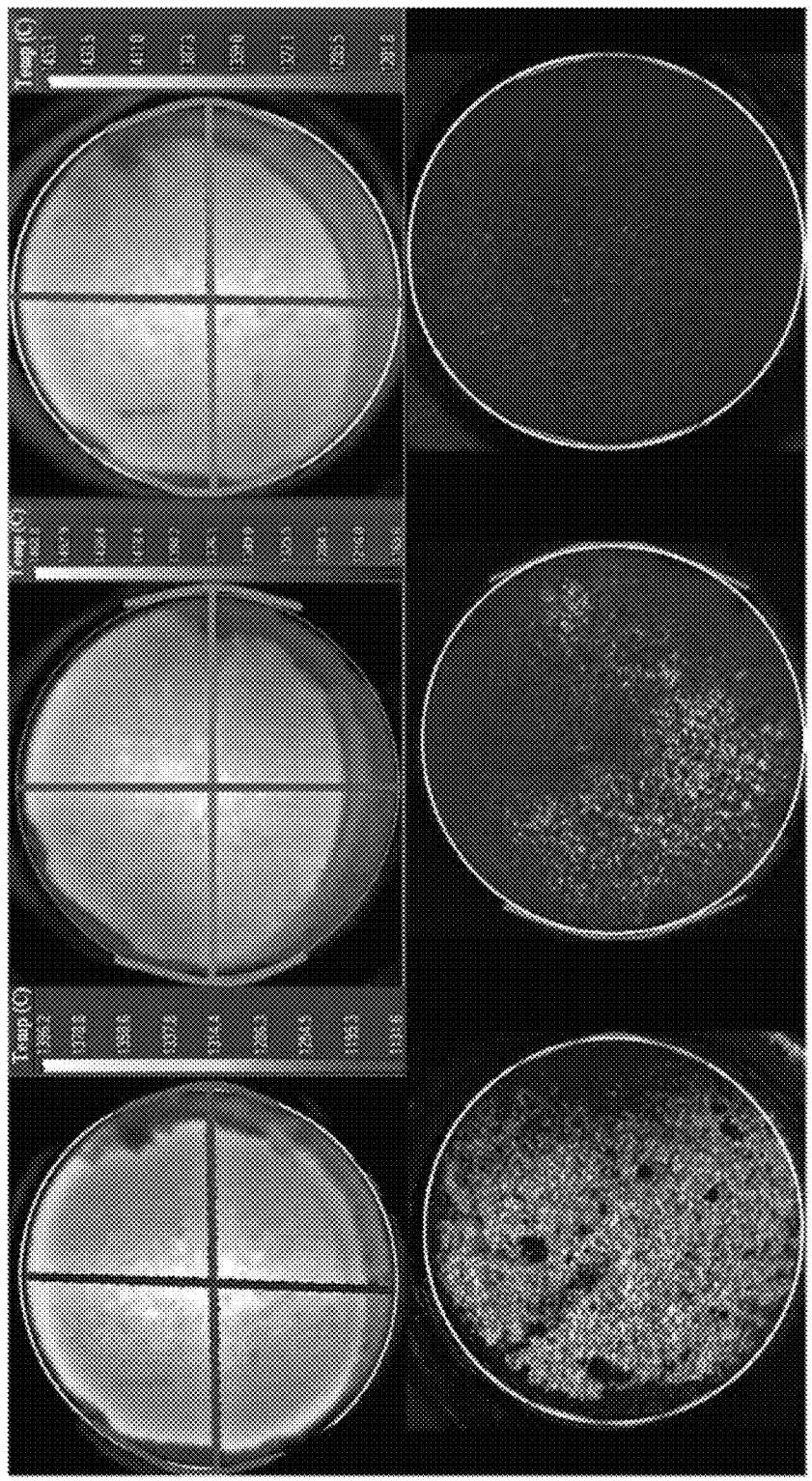

FIG. 20 shows infrared (top) and optical (bottom) images of $UO_2$ pellets prior to cracking at low, intermediate, and high peak currents of 4 A (left), 6 A (middle), and 8 A (right), respectively and from left to right: $UO_2$ pellet identifiers U4-50 (4 A), U5-26F (6 A), and U5-22C (8 A).

Figure 21:
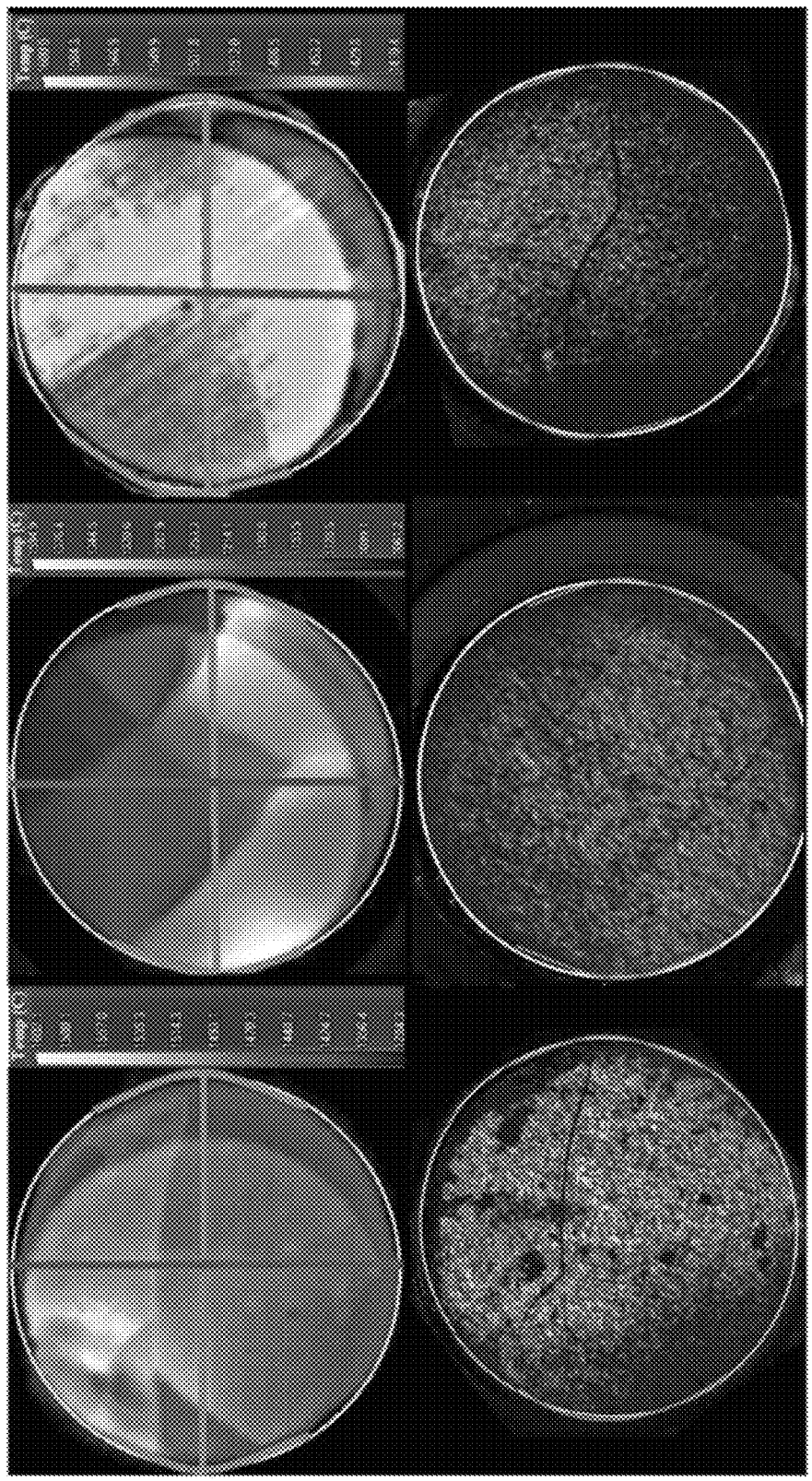

FIG. 21 shows Infrared (top) and optical (bottom) images of $UO_2$ pellets after cracking at low, intermediate, and high peak currents of 4 A (left), 6 A (middle), and 8 A (right), respectively and from left to right: $UO_2$ pellet identifiers U4-50 (4 A), U5-26F (6 A), and U5-22C (8 A).

Figure 22:
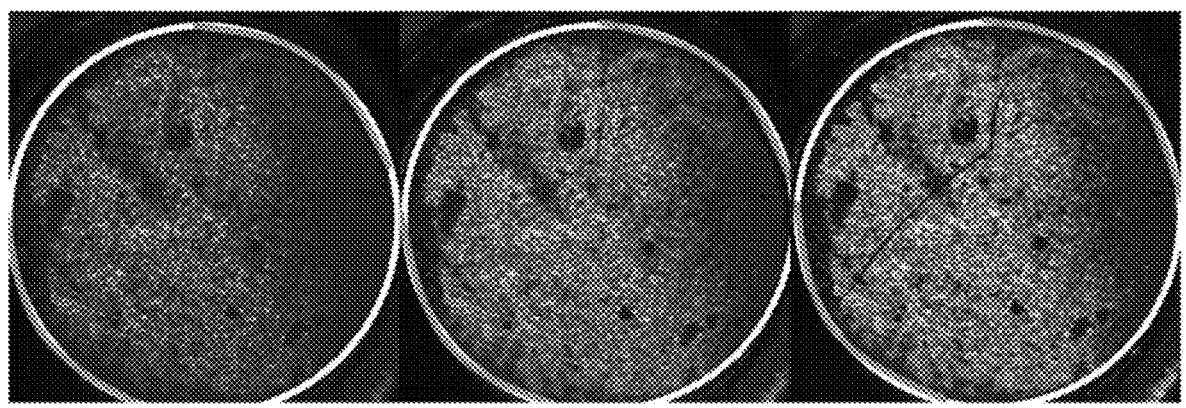

FIG. 22 shows a U4-50 pellet with cracking showing the moment before cracking (left), the first crack initiation at the electrodes (center), and crack propagation (right).

Figure 23:
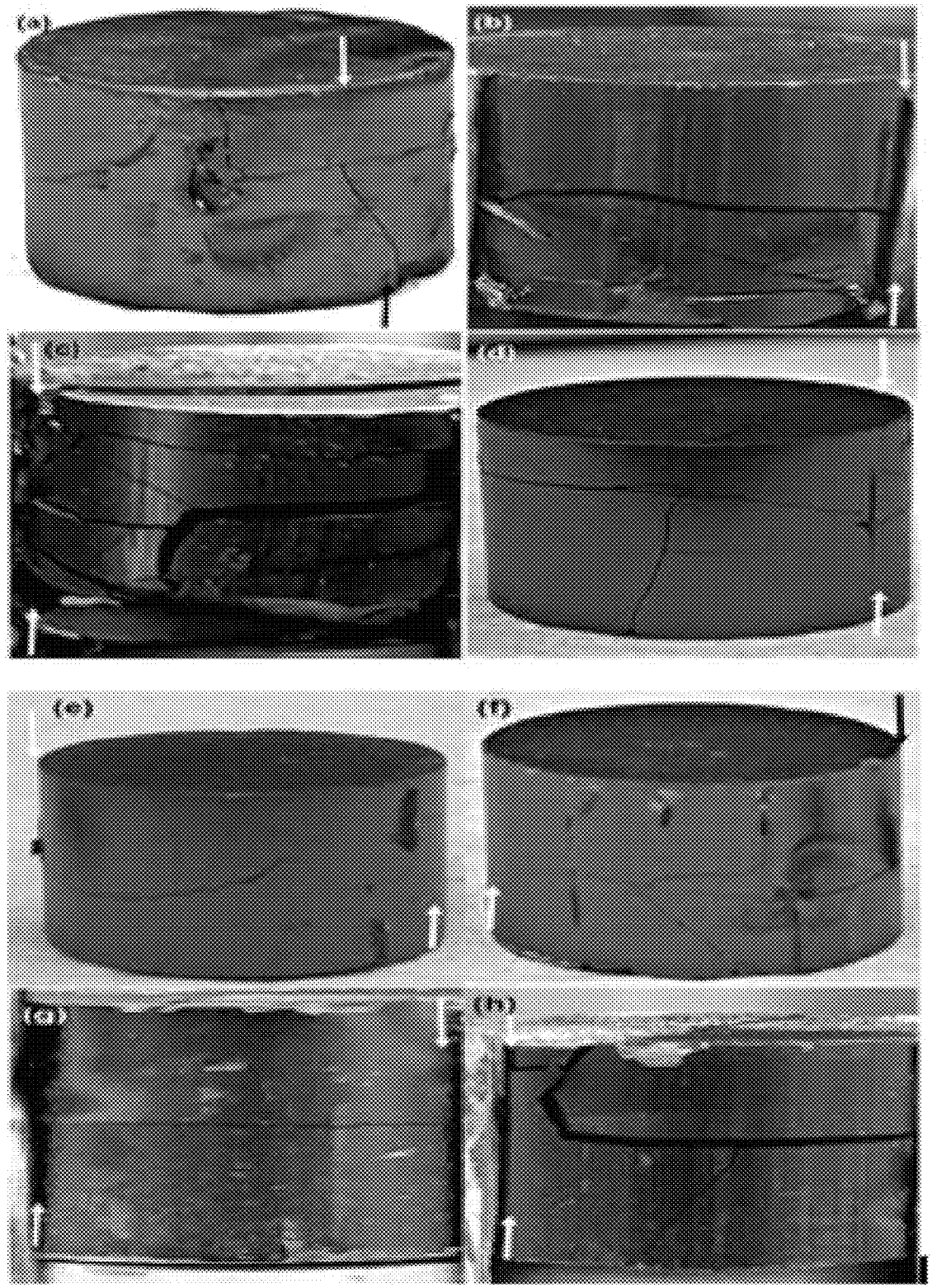

FIG. 23 shows side views of $UO_2$ pellets after removal from test stand, showing axial cracking: (a) U4-50, (b) U5-45B, (c) U3-38, (d) U5-26F, (e) U5-22C, (f) U5-20C, (g) U1-38A, and (h) U5-20D.

Figure 24:
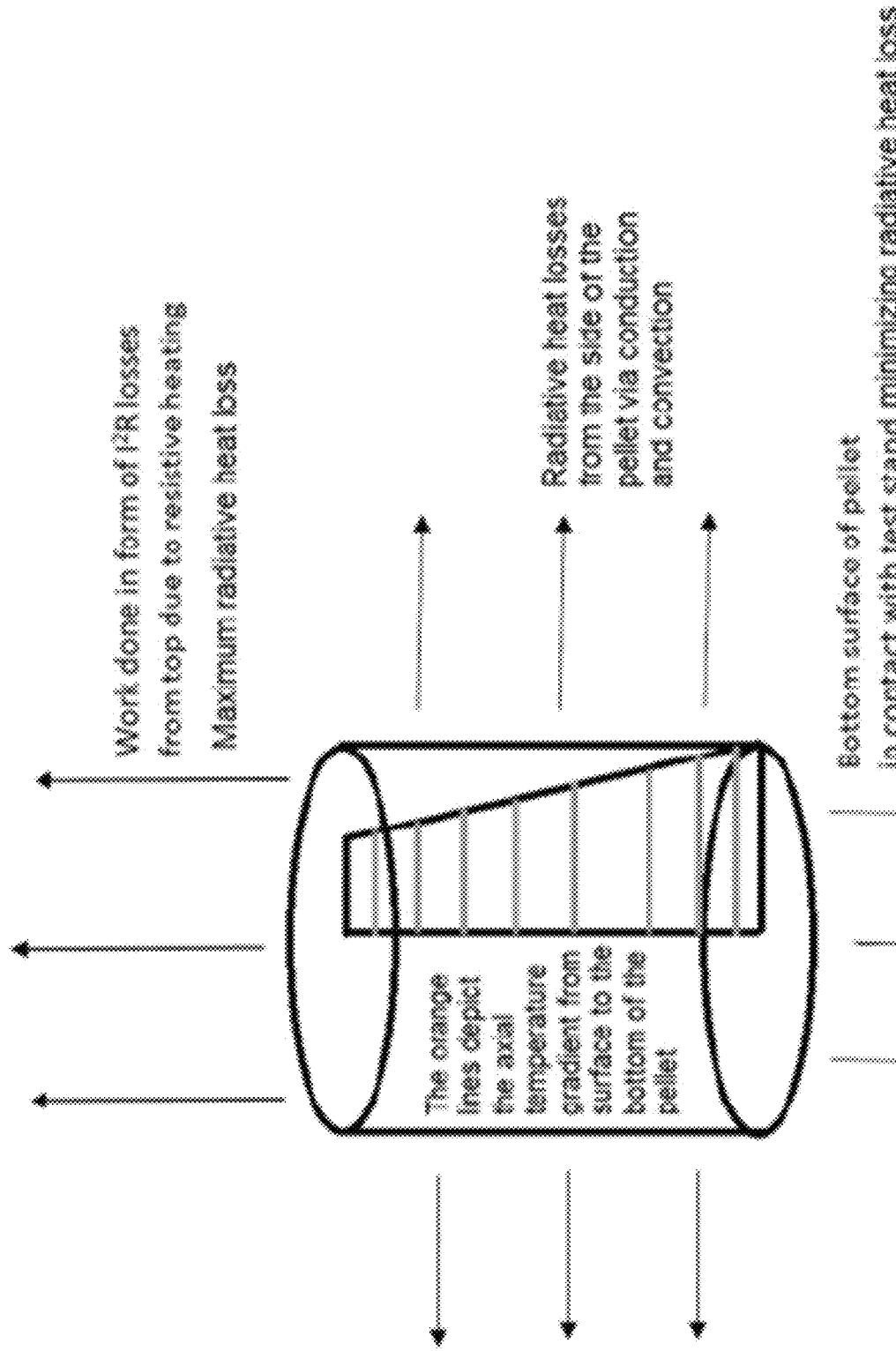

FIG. 24 shows a schematic showing how heat loss from the top surface results in an axial temperature gradient in the pellet.

Figure 25:
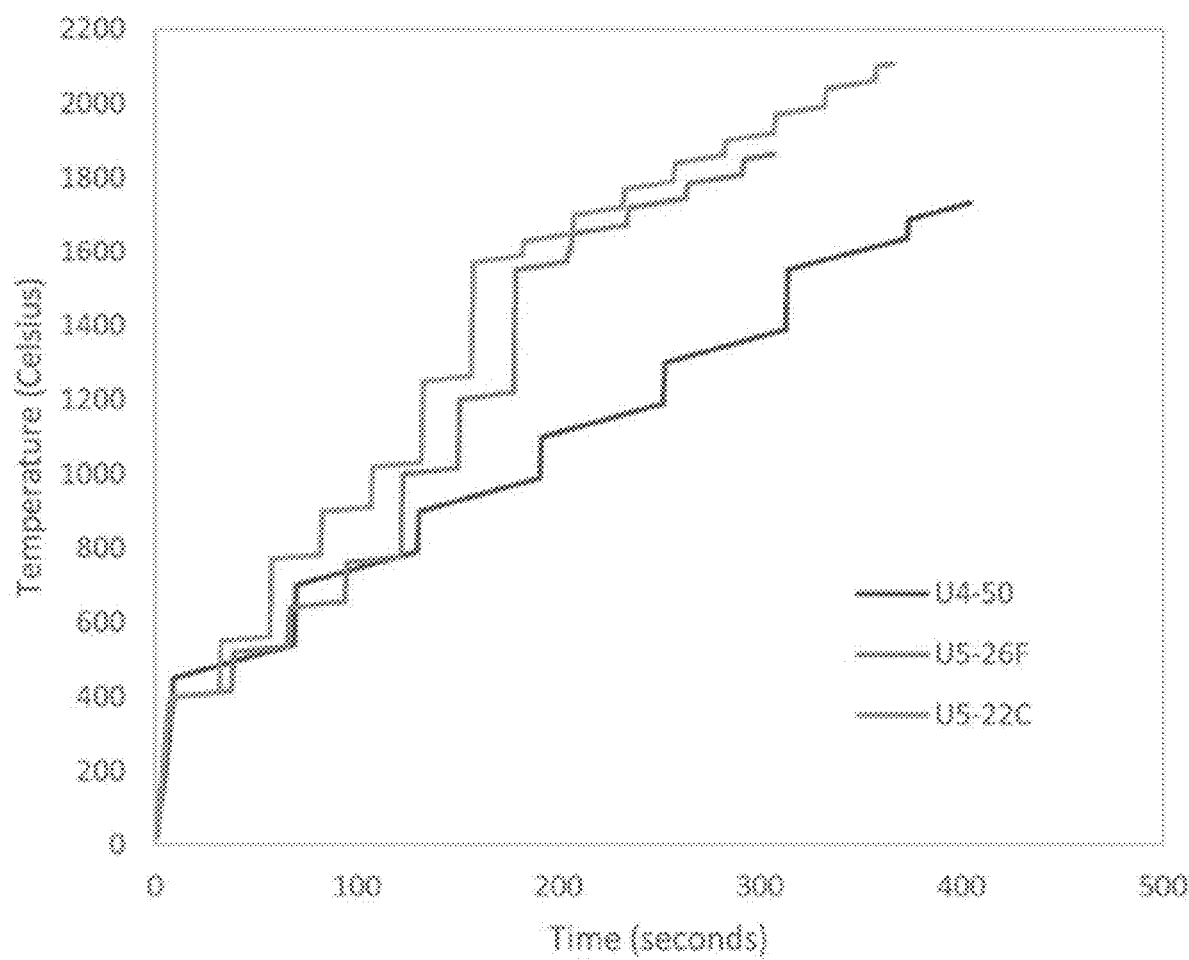

FIG. 25 shows time history of peak temperatures for pellets U4-50, U5-26F, and U5-22C.

Figure 26:
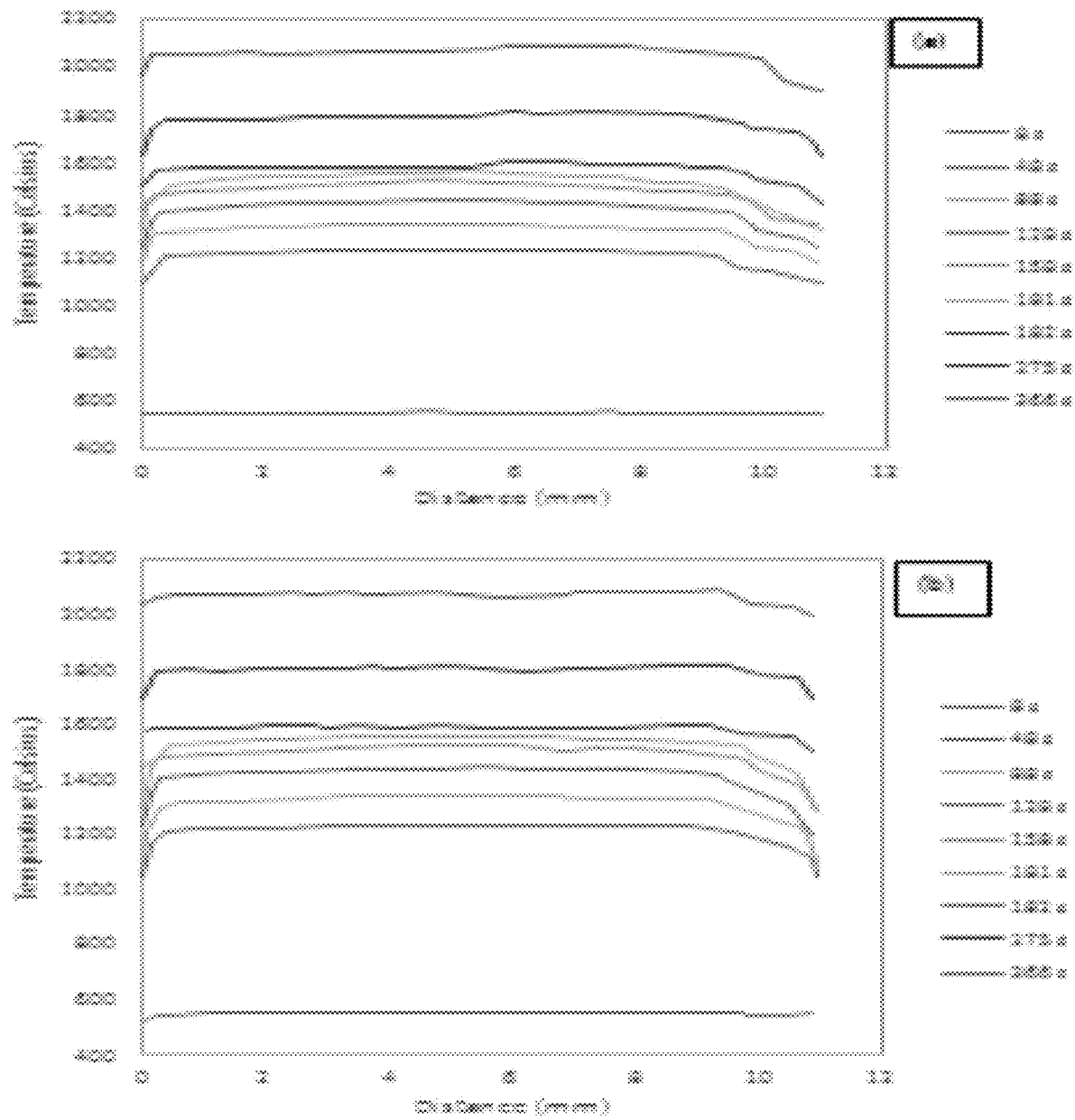

FIG. 26 shows temperature profiles for pellet U5-22C along (a) horizontal and (b) vertical axes at various points in time during the resistive heating phase of the experiment.

Figure 27:
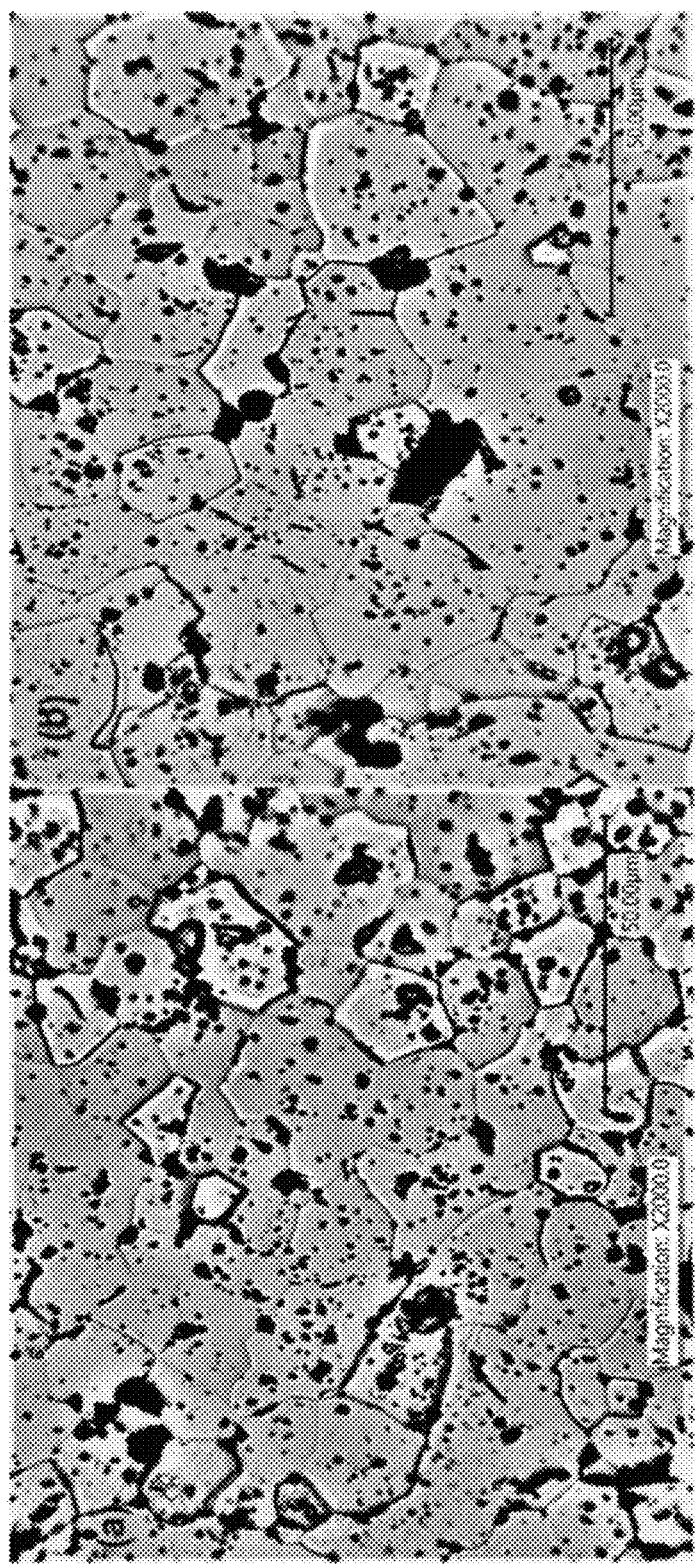

FIG. 27 shows optical microscopy image of a chemically etched pellet, showing grain boundaries at: (a) center and (b) edge under polarized light.

Figure 28:
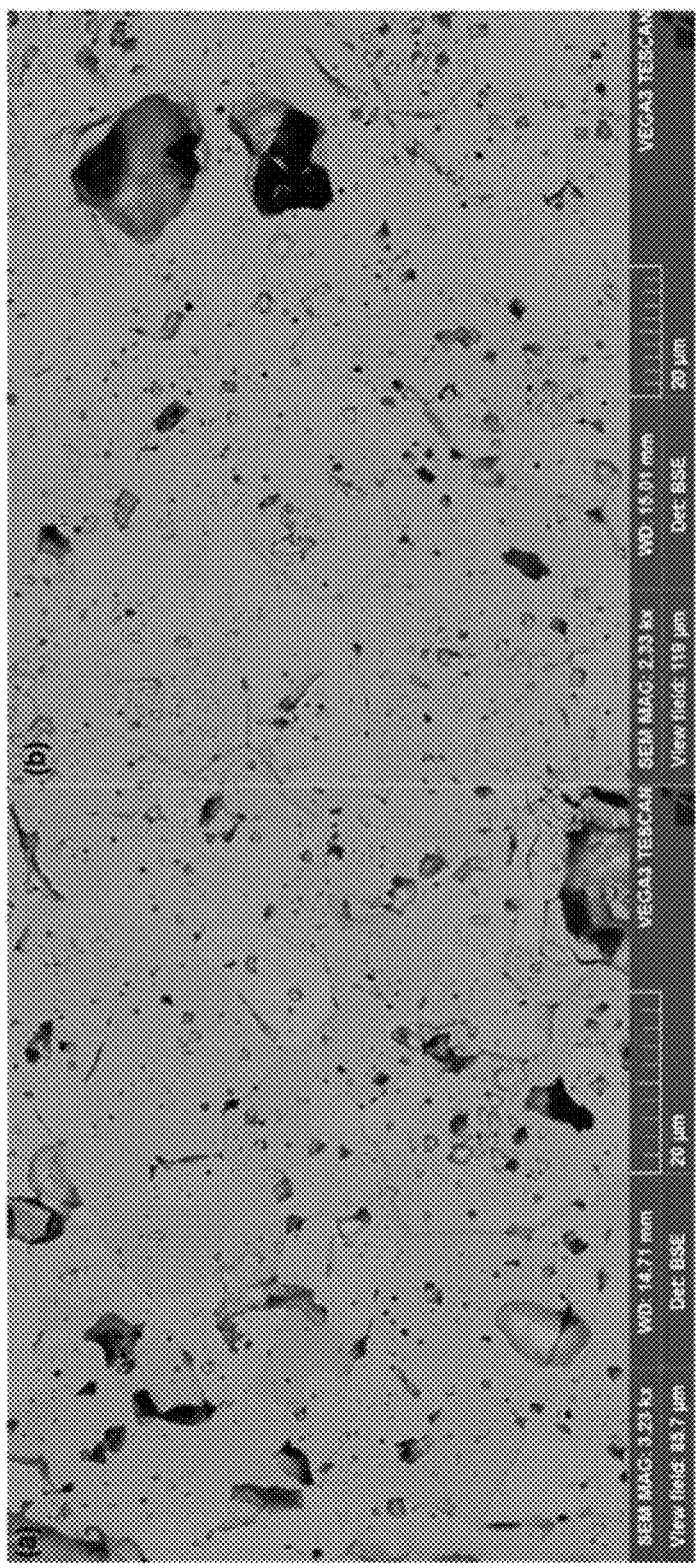

FIG. 28 shows a SEM image of an etched $UO_2$ pellet, showing grain boundaries at (a) center and (b) edge.

Figure 29:
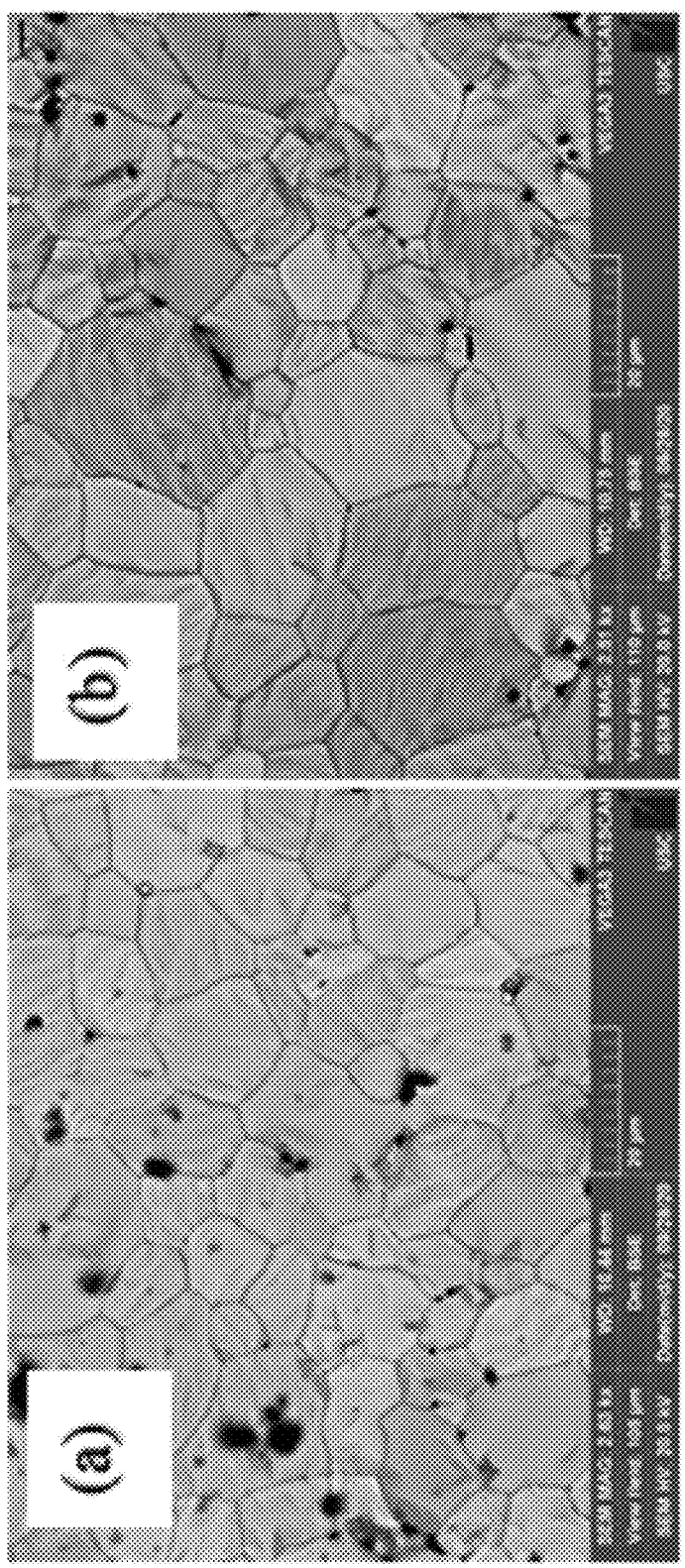

FIG. 29 shows an SEM image of an as-fabricated pellet surface, showing well-defined grain boundaries at (a) center and (b) edge due to thermal etching; the black spots within the grains are impurities or inclusions, and the ones on grain boundaries are pores.

Figure 30:
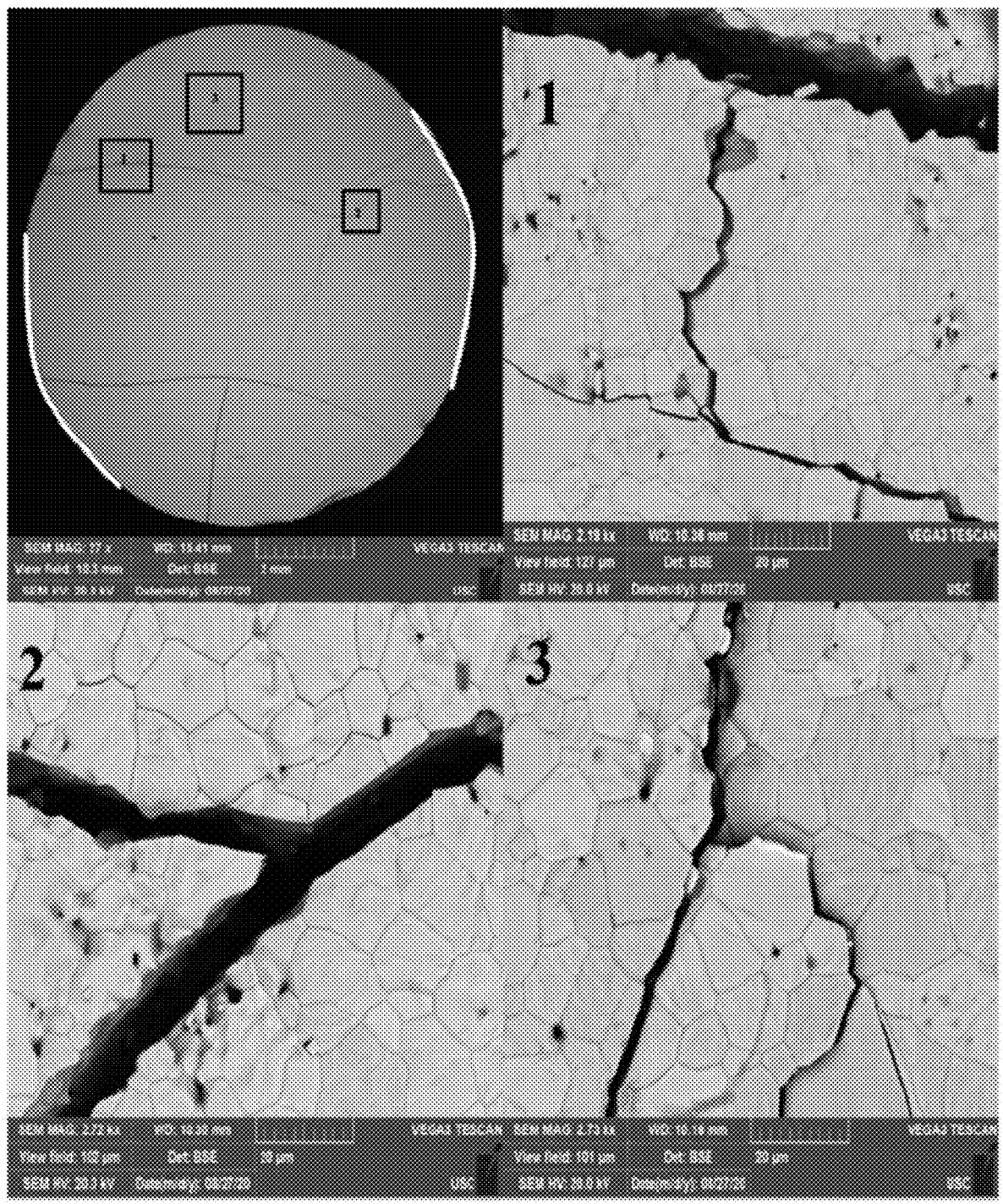

FIG. 30 shows SEM imaging of $UO_2$ pellet U5-26F (6.0 A) after resistive heating.

Figure 31:
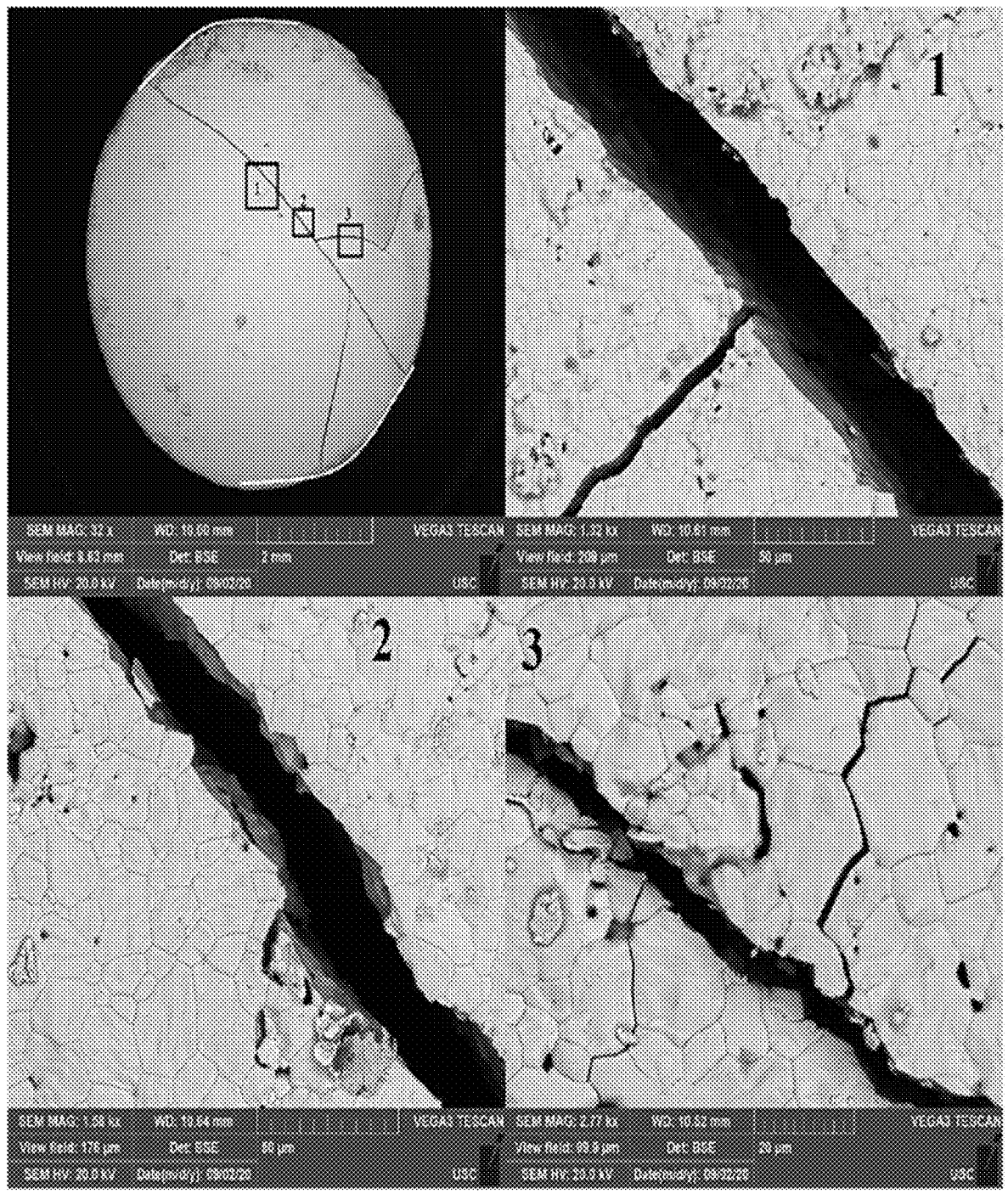

FIG. 31 shows SEM imaging of $UO_2$ pellet U4-50 (4.0 A) after resistive heating.

Figure 32:
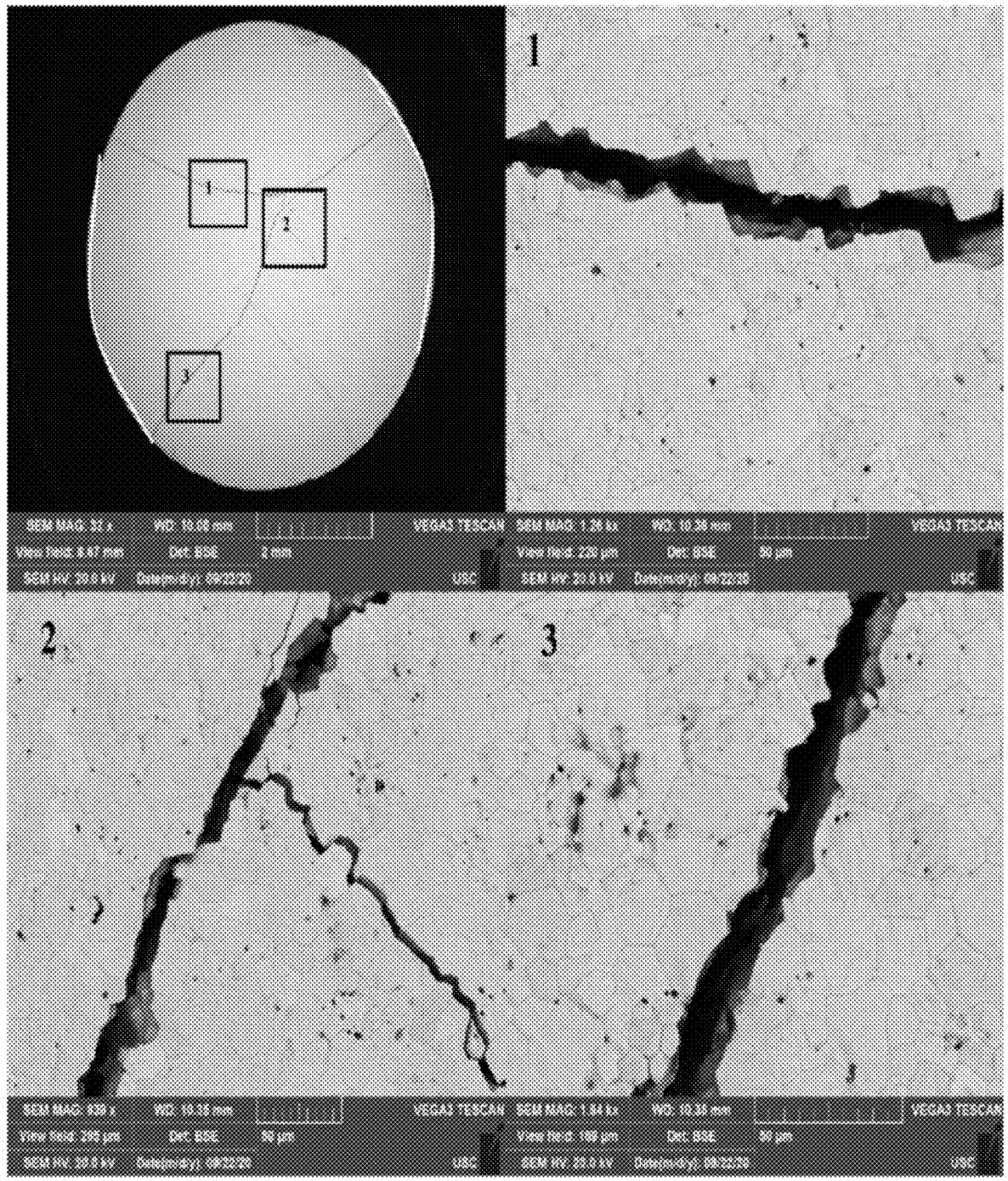

FIG. 32 shows SEM imaging of $UO_2$ pellet U5-20C (8.0 A) after resistive heating.

Figure 33:
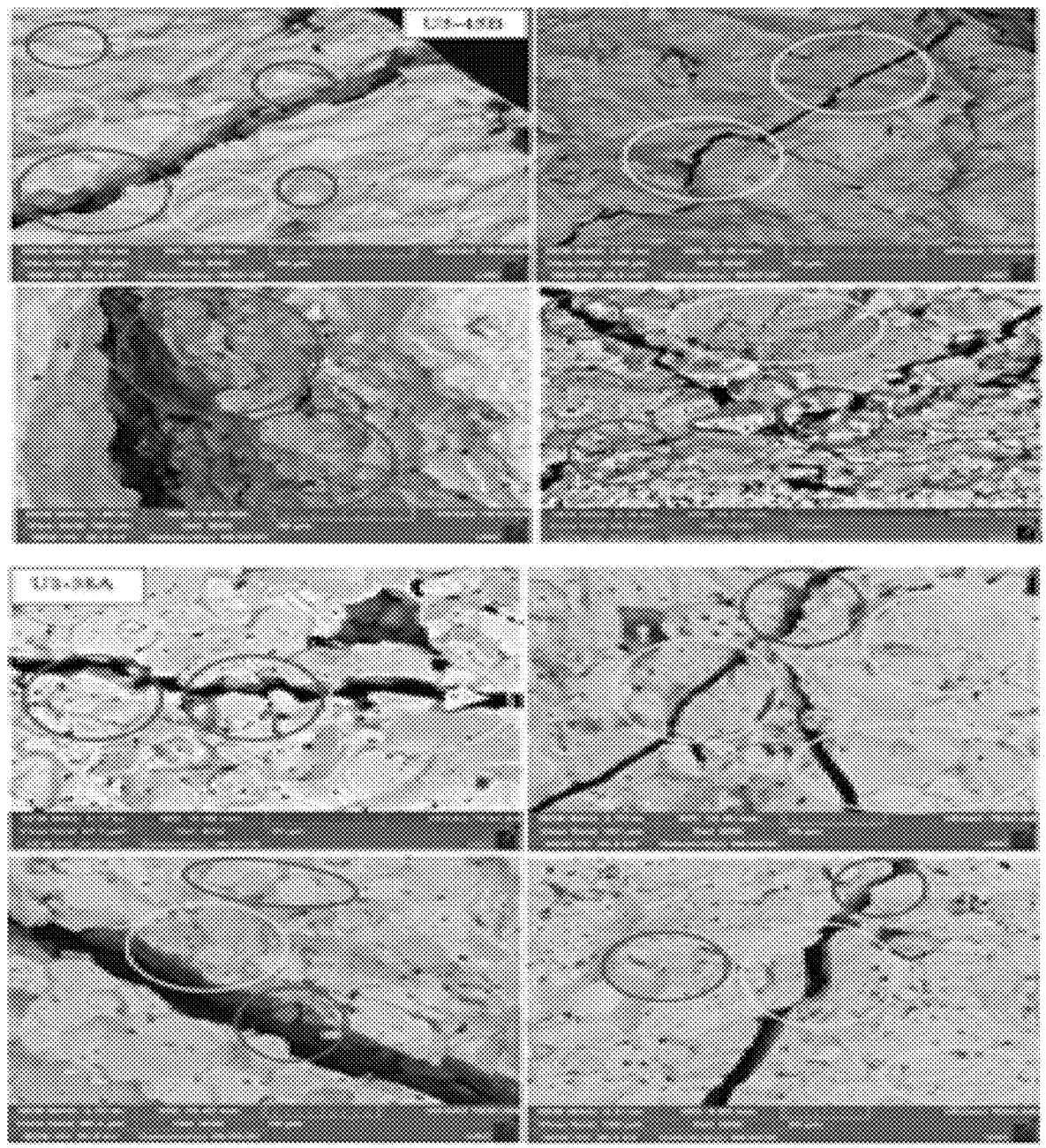

FIG. 33 shows SEM images showing the fractured surfaces of pellets U5-45B (4.0 A) and U1-38A (5.0 A), both of which underwent resistive heating. Red circled regions indicate intergranular fracture while yellow circled regions indicate intragranular fracture.

Figure 34:
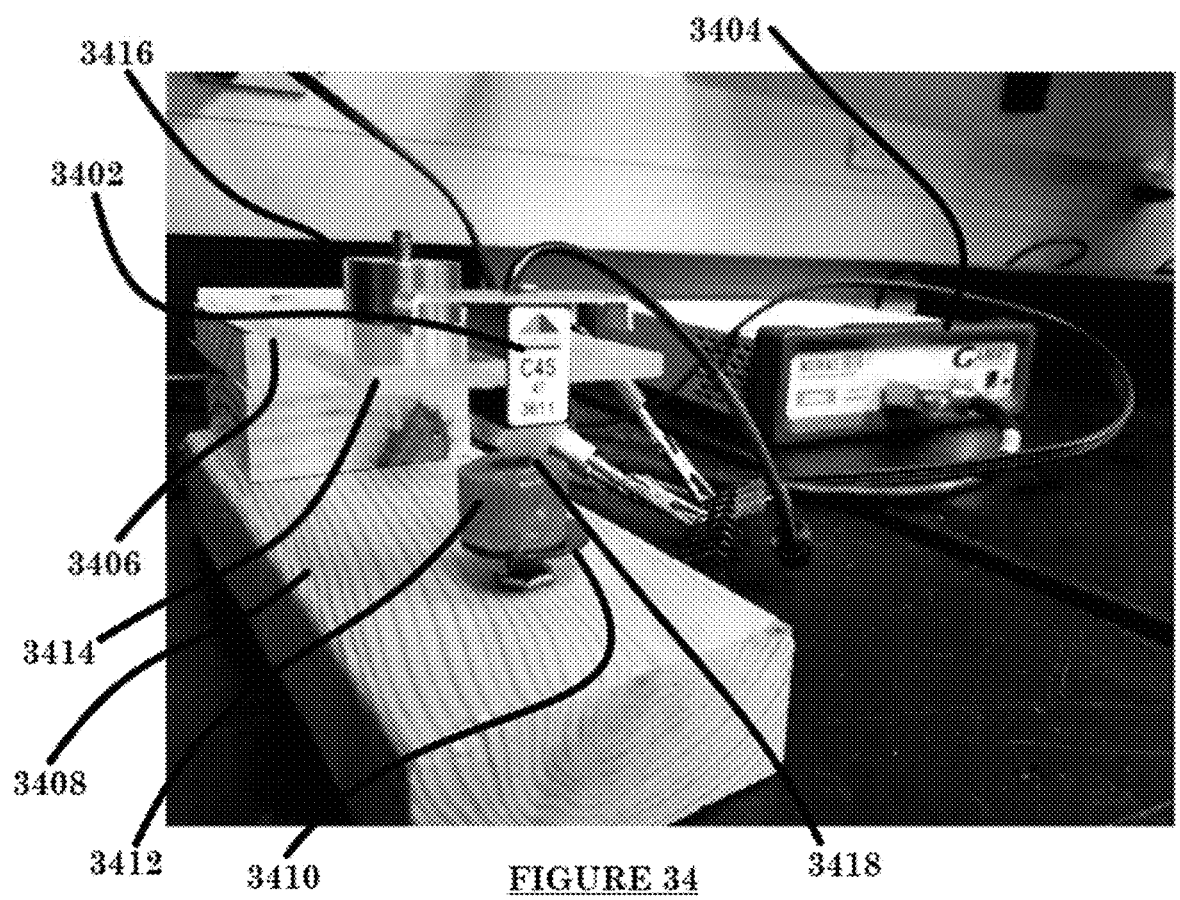

FIG. 34 a setup for electrical resistivity measurements of $UO_2$ pellets at room temperature.

FIG. 35 shows Table VI.

FIG. 36 shows Table VII.

Figure 37:
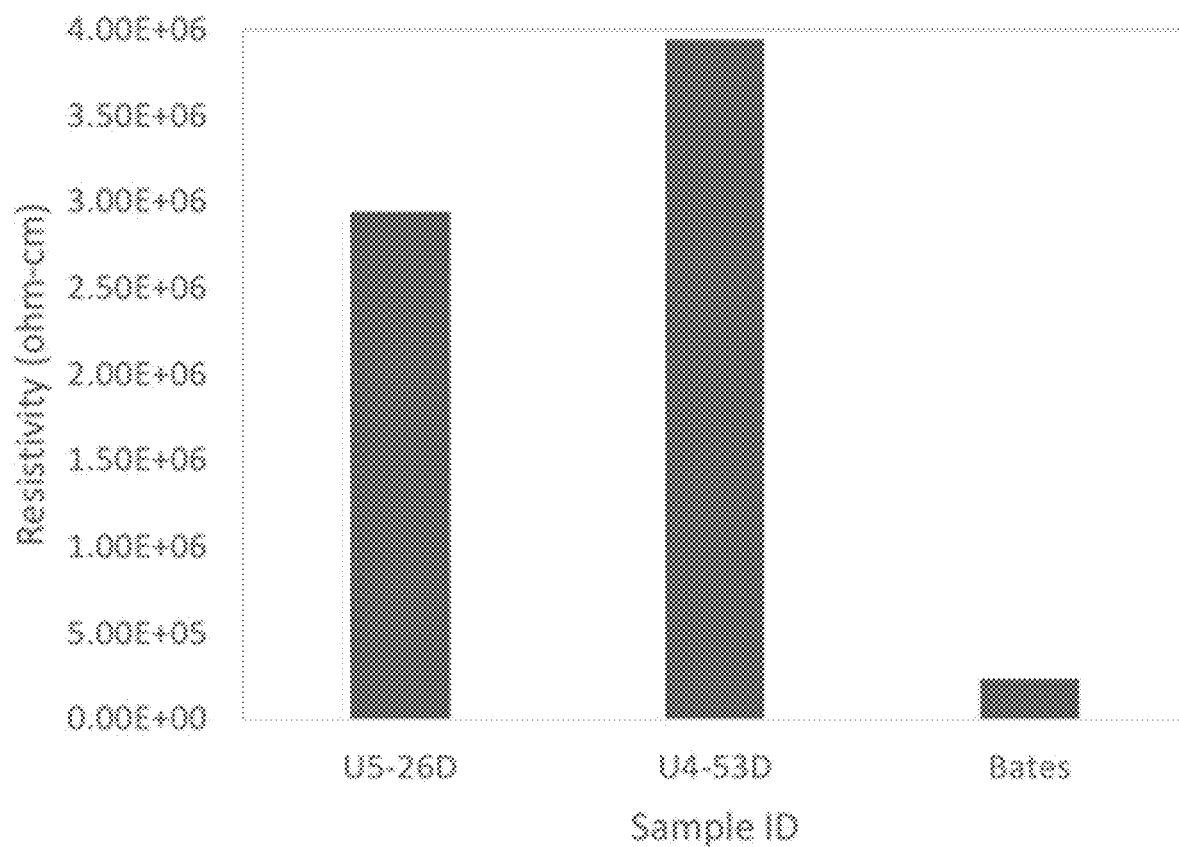

FIG. 37 shows resistivity of $UO_2$ samples, as compared to the values in the literature.

FIG. 38 shows a summary of $UO_2$ tests for the current disclosure.

FIG. 39 shows test conditions for various fuel pellets.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

This innovation is known as dual imaging technology, a non-destructive evaluation technology for material characterization. It consists of a combination of optical and infrared imaging system which can characterize thermo-mechanical behavior of materials and also spatial temperature distribution across any material of interest in-situ.

This novel approach involves very precise configuration of beam splitter and bandwidth filter for maximum efficiency considering loss of intensity due to absorption, reflection and radiation. Simultaneous real-time dual imaging of ceramic oxide fuel pellet surface was done using this innovation. An optical and infrared camera system was mounted along axial and perpendicular directions to a pellet surface, respectively. A beam-splitter was used to split the incoming radiation from the sample into two halves. While one of the beams was transmitted from the splitter through a band pass filter to obtain optical images, the other beam was reflected from the splitter to the thermal camera to capture full-field temperature gradients.

This innovation will be instrumental in capturing cracks and temperature profile of Uranium Dioxide ($UO_2$) fuel pellets in-situ when the fuel undergoes transients replicating an accident situation with sudden rise in reactor power. The cracking data obtained will be extremely useful in validating and improving the current cracking models in BISON fuel performance codes. This will eventually lead to predict cracking in fuel under reactivity initiated conditions in a reactor. These efforts are a part of the UD-DOE's initiative for restarting of the Transient Test Reactor at Idaho National Laboratory.

An experimental set up was built to study cracking in ceramic oxides and other materials. A ceramic sample was heated inside a stainless steel vacuum chamber. The interesting feature of the set up was the simultaneous real time dual imaging system: infrared and optical imaging. The optical imaging system was used to image the cracks on the sample and the infrared camera was used to measure the temperature distribution across the sample in-situ. The dual imaging set up along with dual heating (induction and direct resistance heating) can be used to study thermo-mechanical and thermo-chemical behavior of materials. This innovation along with LabVIEW not only enables studying mechanical deformation and temperatures of materials but also records flow of gases and monitors oxygen partial pressure of reactive and inert gases.

Using resistive heating to replicate the volumetric heating that occurs in the nuclear reactor is attractive because it permits more extensive instrumentation than would be possible in an experiment in the reactor. This approach is being used in the experimental work done at University of South Carolina.

The current work allows for imaging of the top surface of a fuel pellet to observe the formation of radial cracks. It also employed resistive heating to volumetrically heat the fuel pellet, but instead of passing the current axially through the pellet, electrodes were placed on the sides of a single pellet to pass the current transversely across the pellet. This allowed for an unobstructed view of the top surface of the pellet. These experiments are being performed using a state-of-the-art experimental setup developed at the Nuclear Materials Laboratory at the University of South Carolina (USC). This system employs a unique dual imaging technique where the infrared camera captures the full field temperature gradient in the pellet and the optical camera system captures the physical images of cracks simultaneously in real time.

The current disclosure provides: (1) dual imaging—real time imaging of cracks using optical camera system and simultaneously measuring the temperature profile across the sample; (2) Induction and Direct Resistance Heating (DRH)—dual heating—induction heating is used to heat the ceramic oxide sample to a threshold temperature to conduct current while DRH is used for volumetric heat generation in the sample; (3) coverage for a wide range of materials and can measure temperature gradients for both conductive and insulator materials; (4) representative conditions of a nuclear reactor measuring partial pressure oxygen of reactive and non-reactive/inert gases; (5) collecting multiple sets of data at same time; more efficiency and accuracy; correlates data coming from same set up and test conditions; reliable way of fast data collection; (6) as all data sets are recorded in-situ no data is lost, which is very valuable for quality assurance and quality control.

Temperature gradients in ceramic light water reactor (LWR) uranium dioxide ($UO_2$) nuclear fuel pellets generate thermal stresses that cause fractures in the fuel, which begins early in the life of fresh fuel. The combination of heating due to fission and forced convective cooling on the exterior of LWR fuel rods generates a temperature profile that is difficult to replicate outside the reactor environment. For this disclosure, a state-of-the-art experimental setup using electrical heating to study certain aspects of temperature driven fracture was built, and surrogate fuel materials such as ceria ($CeO_2$) were used to validate the system. Cracking experiments were conducted on these surrogates by inducing reactivity-initiated-accident-like temperature gradients in the pellets via induction and direct resistance heating. Induction heating was done using copper coils and molybdenum susceptors, which heated the surrogates to a threshold temperature that is sufficiently high for the fuel material to conduct current. Thereafter, direct resistance heating was achieved by passing current through the specimen using a DC power supply to introduce volumetric heating to replicate LWR operating conditions. The pellets were held against nickel electrodes and mounted on a boron nitride test-stand. All the tests were carried out in a stainless-steel vacuum chamber. Simultaneous real-time dual imaging of the surrogate pellet surface was implemented using an optical and infrared camera system that was mounted along axial and perpendicular directions to the pellet surface, respectively. A beam-splitter was used to split the incoming radiation from the sample into two halves. While one of the beams was transmitted from the splitter through a band pass filter to obtain optical images, the other beam was reflected from the splitter to the thermal camera to capture full-field temperature gradients of the as-fabricated pellet surface during cracking. Some initial tests were conducted with a 2-color pyrometer that was later substituted with a forward-looking infrared thermal camera to capture the temperature profiles. A LabVIEW data acquisition system was set up for collecting useful data during experiments.

The behavior of light water reactor (LWR) fuel is significantly affected by fracture. The fission process in the cylindrical fuel pellets causes volumetric heating that, in conjunction with the forced convective cooling on the exterior of the fuel rod, results in a parabolic temperature profile. This leads to significant tensile stresses on the pellet exterior that result in crack initiation in fresh fuel early in the initial ramp to power. Fuel fracture is more of a reliability and economic concern, but it has important implications on fuel performance in normal operating conditions. Fracture is of interest for understanding fuel behavior during accident conditions. In the event of cladding rupture, dispersal of fuel fragments into the coolant is affected by their size. Consequently, under accident scenarios, this process is characterized by fuel pellet expansion caused due to thermal gradient, which eventually leads to pellet-clad mechanical interaction (PCMI).

As part of ongoing efforts to improve the fidelity of fuel performance simulations, several techniques have been applied to more realistically simulate fracture in nuclear fuel. Fuel performance codes such as BISON and Transuranus have been useful to model pellet-clad mechanical interaction (PCMI) in LWR fuel pellets. Early life thermal fuel fracture has been modeled using the extended finite element method (XFEM) and discrete element method (DEM). Also, other approaches such as molecular dynamics and finite element cohesive zone methods have been used in modeling dynamic fracture of ceramic fuel pellets.

While the above techniques appear promising, they have limited experimental data available to validate simulation results. The ability to replicate the thermal conditions experienced by LWR fuel in the reactor in a laboratory environment facilitating a direct observation of crack propagation will significantly advance the understanding of fuel fracture and provide validation data for computational models. To this end, a state-of-the-art experimental setup has been designed in the Nuclear Materials Laboratory at the University of South Carolina. The primary objective of the test rig includes mapping spatial variations in the temperature and capturing optical images of crack propagation in the fuel pellet subjected to temperature gradients. These results address a key need for validation data for LWR fuel performance simulations.

For the purpose of replicating the temperature profile in the fuel pellet, it is important to have a means to apply volumetric heating to the fuel and to remove heat from the exterior of the fuel. In this work, volumetric heating is done by resistive (Joule) heating. Ceramic $UO_2$ is an electrical insulator at low temperatures. The fuel material must be heated to a temperature that is sufficiently high to allow an electric current to be passed through the fuel. This is accomplished in this work by inductive heating of the pellet via a susceptor.

Experimental Test Setup

Resistive heating of LWR fuel has been used previously to simulate reactor conditions. In a study performed in the late 1970s at the Argonne National Laboratory, stacks of $UO_2$ pellets were tested under transient temperature conditions. In that work, a high voltage, low-current (2500 V and 20 A) electrical power supply was used for the initial pre-heating followed by a low-voltage, high current (300 V and 300 A) power supply to induce the power ramps for the transients leading to reactor like reactivity-initiated-accident (RIA) conditions. Kennedy et al. also used an extensive helium cooling system that ran for 1000 h at a flow rate of 700 l/min. The temperatures were recorded by a system of pyrometers, and the cracks were detected by acoustic emission methods. The change in the dimensions of the pellets was captured by a laser dilatometer. There was no in situ characterization of the fracture patterns in that work.

Figure 1:
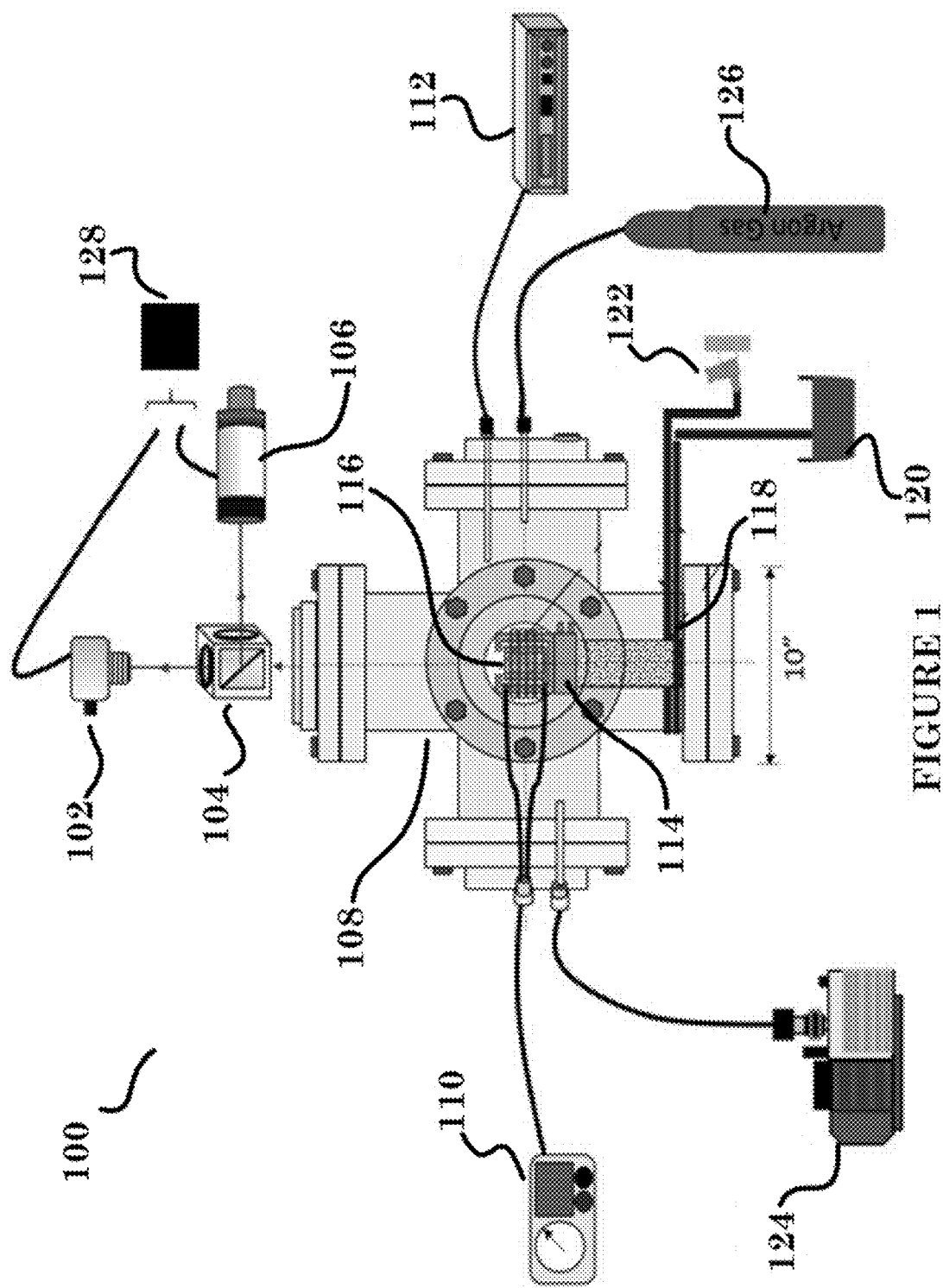
FIG. 1 shows one embodiment of a schematic representation of the experimental setup of the current disclosure.

The current disclosure setup has been built for studying cracking in a single pellet subjected to induction heating in a susceptor that radiatively heats the pellet. This step is then followed by direct resistance heating. An important aspect of this experimental design is that it allows for direct infrared thermal imaging and optical imaging of the pellet. This allows for the temperature profile to be accurately characterized and for crack propagation to be observed in situ. Both imaging systems capture the data simultaneously in real time. To accommodate imaging of the top surface of the fuel pellet, a single pellet is tested (rather than a stack of pellets in the previous study). The electrical current is passed through the sides of the pellet rather than passing axially. The overall schematic of the experimental setup is shown in FIG. 1. FIG. 1 shows experimental setup 100, which may include optical camera 102, beam splitter 104, thermal camera 106, 6-Way Cross Vacuum Steel Chamber 108, Power Supply for resistive heating 110, Setnag GenAir $0_2$ Gauge 112, base 114, test stand 116, support 118, sink/drain 120, tap 122, temperature resistant diaphragm pump 124, Argon gas source 126 and computer 128.

Test Chamber

The cracking studies were performed in a vacuum environment to avoid the presence of oxygen, which might result in oxidation of the sample. Thus, the test chamber was a custom-made stainless steel six-way cross for ultra-high vacuum applications. This also facilitates the connections of various feedthroughs for connecting electrical, optical, vacuum, and gas systems necessary for the experiments. The ISO door designed on the chamber was helpful for convenient access into the chamber for loading and unloading of the sample on to the test stand.

All conflat flanges, feedthroughs, and blanks were assembled and connected onto the six-way cross using either through-hole or tapped bolts that were secured by nuts. All the vacuum connections were liquid leak tested.

Induction Heater with Water Chiller

Typically, the conduction to valence energy bandgap in ceramics is greater than 2.5 eV, which makes them electrical insulators at room temperature. Therefore, the ceramic fuel or surrogate material needs to be heated to a certain threshold temperature to be electrically conductive. A benchtop portable mid-frequency induction heater (IH15AB) and water chiller (AI-WAC-1) from Across International were identified as best fit for this application. It was connected to the chamber via the RF power feedthroughs. The induction heater needed 32 A, 208-240 V single phase supply as input for an output frequency of 30-80 kHz with a maximum oscillating power of 15 kW. It has an output current range from 200 to 600 A. The heating, dwelling, and cooling cycles can be timed between 1 s and 99 s each.

DC Power Supply for Direct Resistance Heating

The inductive pre-heating stage was followed by direct resistance heating by a DC power supply using nickel electrodes. The power supply was connected to the vacuum chamber via DC power feedthroughs. The electrical connections were made using crimpers and lug terminals. A DC power supply (N8741A) from Keysight Technologies was chosen for direct resistance heating. It was rated at 300 V, 11 A, and 3.3 kW as output. The input options were 208 VAC or 400 VAC with a 3 phase or 230 VAC, single phase. See, Keysight Technologies, supply (N8714A). By considering thermo-electric behavior of $UO_2/CeO_2$, see MATPRO—Version 11, *A Handbook of materials properties for use in the analysis of light water reactor fuel rod behavior*, NUREG/CR-0497, TREE-1280, U.S. Nuclear Regulatory Commission and I. T. Collier, R. N. Hampton, G. A. Saunders, and A. M. Stoneham, "Electrical conductivity of polycrystalline uranium dioxide," *J. Nucl. Mater.* 168, 268-279 (1989), 1-D heat transfer analysis confirmed that about 5 A, 90 V (for $UO_2$) is needed to achieve an approximate centerline temperature of 1200-1250° C. The voltage and current combination for ceria is higher since the bandgap energy for ceria is about 3.5 eV, which is higher than $UO_2$ at 2.7 eV.

The power supply can be either be controlled manually or programmed internally. It can also be controlled remotely by external user interfaces like LabVIEW and MATLAB.

Dual Imaging System

Figure 2:
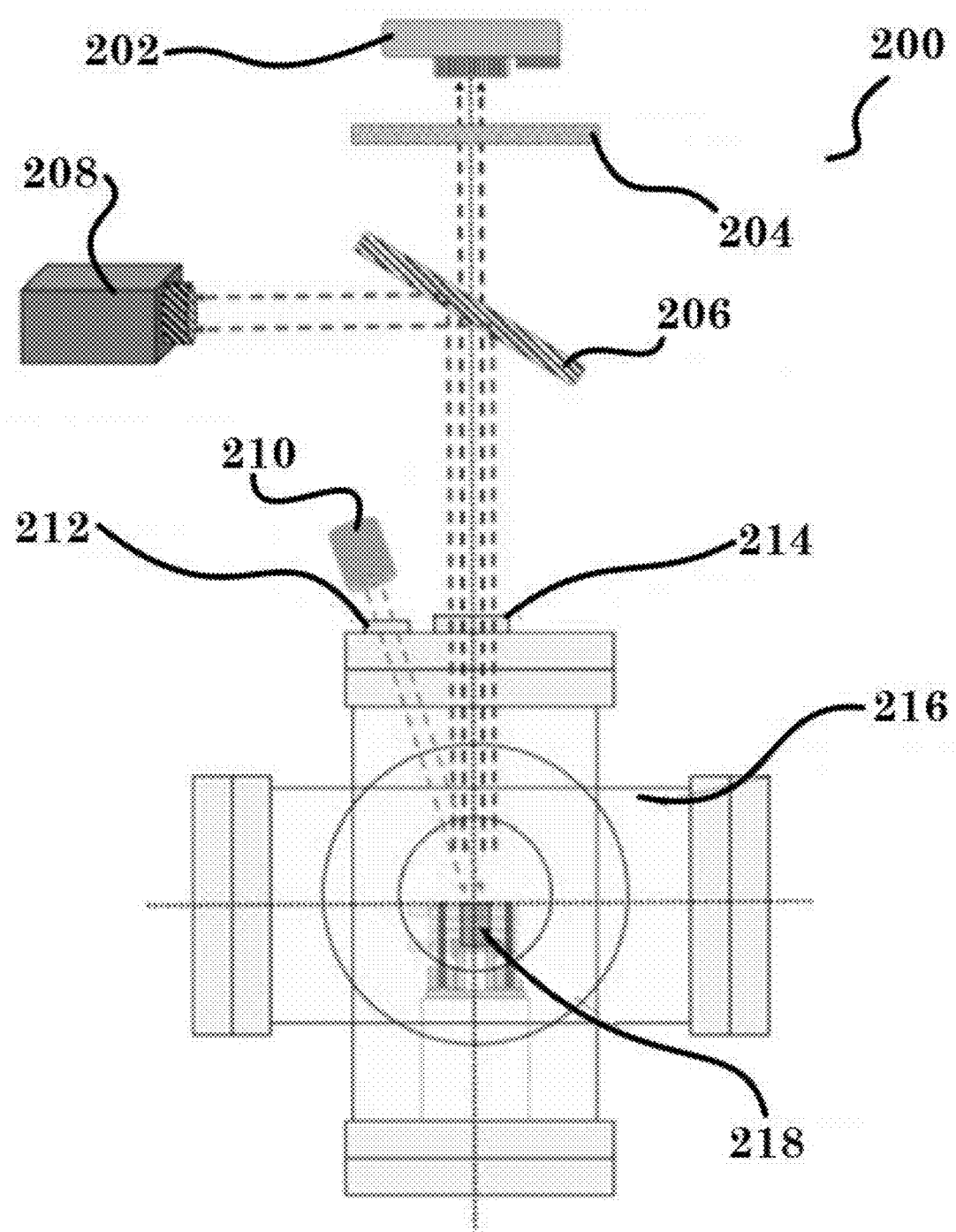
FIG. 2 shows one embodiment of a schematic representation of a dual imaging system.
Figure 3:
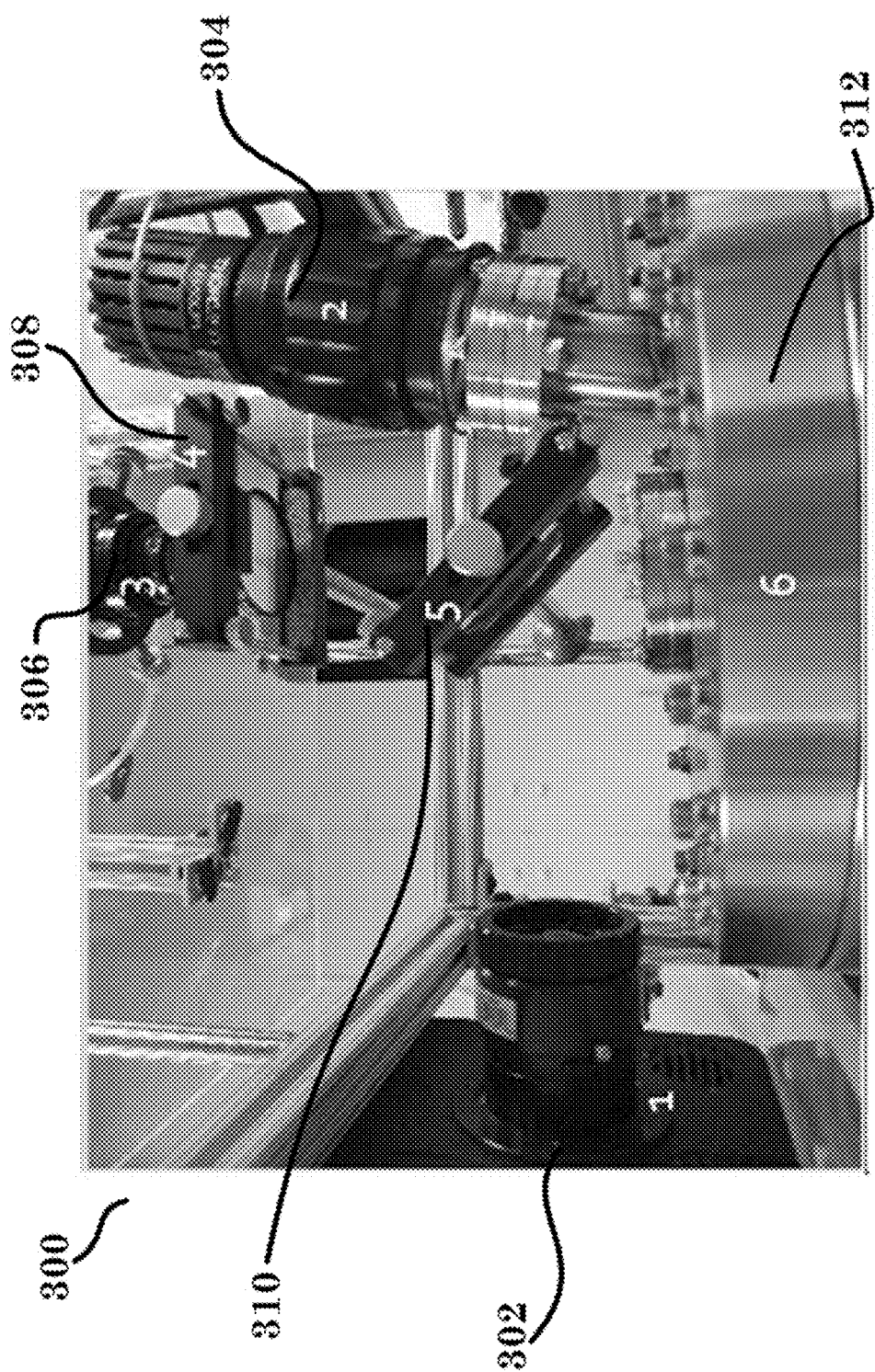
FIG. 3 shows one embodiment of a laboratory setup of the current disclosure.

A novel dual imaging technique was developed in this study for simultaneous, real-time temperature measurement and crack imaging. Infrared and optical imaging systems were mounted at 90° and 0° to the target body (fuel pellet). The emitted radiation from the pellet incident on the dichroic beamsplitter allows part of it to be directed to the infrared camera and the other half directed to the optical camera passing through the band pass filter. The schematic, see FIG. 2, and the image, see FIG. 3, from the laboratory setup of the dual imaging system are shown. As FIG. 2 shows, the dual imaging system 200 may include camera 202, which may be a CANNON optical camera, Infrared Filter 204, beam splitter 206, FLIR thermal camera 208, LED light 210, small view port 212, 2.5" view port 214, 6-way cross chamber 216, and $UO_2$ pellet 218. FIG. 3 shows an image of the physical setup 300 that includes infrared camera 302, LED light source 304, optical camera 306, band pass filter 308, beam-splitter 310, and vacuum flange with dual view ports 312.

Optical System

The beam splitter used in this application has 70% transmittance in the visible wavelength region (400-700 nm) and about 95% reflectance in the IR region (3-12 μm). The specifications of the beam splitter are outlined in Table I, see FIG. 4, which may be an ISP Optics, BSP-DI-50-2 di-chroic gold coated Beamsplitter. The camera detector has about 88% sensitivity to blue light, 90% sensitivity to green, and about 100% sensitivity to red light and may be an Optical camera DCC1645C from ThorLabs.

Among the available sources of light, the M450LP1 royal blue light-emitting diode (LED) light from Thorlabs is used, which has a maximum normalized intensity of 1.0 between 400 nm and 450 nm for this LED source. The LED light has a 2000 mA and 1850 mW of current and power output, respectively, which translates to about 166.5 lumens. The selection of such a LED is optimum for the optical camera's performance since the camera has about 88% relative sensitivity at 450 nm wavelength of blue light. Even though the camera is more sensitive to red light, the blue LED light has better optical output than the available red LED (94.5 lumens); hence, it provides better illumination and better visibility of the surface of the pellet. A band pass filter with 90% transmission of 450 nm was chosen for this application, which may be a Band pass filter No. 65-201 from Edmund Optics.

Infrared Imaging System

Infrared imaging is used here for non-contact temperature measurement of the surface of the pellet. A mid-wave infrared (MWIR) forward-looking Infrared (FLIR) SC6703 camera was found to be the most suitable device for temperature measurement. This has a cooled indium antimonide detector with a maximum 640 times 512 pixels resolution with a 15 μm detector pitch. It works in the spectral range of about 1.5-5 μm and measures temperatures from −20° C. to 3000° C. with ±2° C. error in the readings. For the present setup, at a working distance of 15 in. with a 0.25-in. extender ring and 50 mm lens, the detector can get to 52 μm/pixel with a resolution of 640 times 512 pixels on the pellet surface (~10 mm diameter), which may be a FLIR infrared camera model sc6703.

Optical Camera and Viewport

The optical camera from Thorlabs has a CMOS sensor with about 90% sensitivity to blue light. It has a pixel size of about 3.6 μm with 1280×1024 pixel resolution. The camera is connected to a c-mount adapter followed by extension tube, zoom lens, and a magnifying lens to complete the assembly. The extension tube MVL20A is compatible with 6.5 times and/or 12 times magnification zoom lenses. It enhances the magnification by 0.5-2 times. A 12 times magnification zoom lens has been identified for better imaging at a working distance of 15 in. The zoom lens offers a wide range of variable magnification between 0.58 and 7 times along with 3 mm fine focus adjustment with a coaxial illumination port. The last part of the optical camera system has a magnifying lens attachment, which provides an additional 0.25-2× magnification to the zoom lens and extension tube. See Extension tube, MVL20A No. 6711, Zoom lens, MVL12X3Z, Magnifying lens attachment, MVL12X20L, all available from Thorlabs.

Sapphire has been chosen as the viewport for the chamber because of high temperature application and the high transmittance (88%) in the IR wavelength region (0.5-5 μm) and about 80% at 4.5 μm, which is the wavelength the LED light source for visible spectrum, which may be a Sapphire viewport WG3105 from Thorlabs. The camera, splitter, filter, viewport, and the pellet surface are uniaxial, which provides optimum results, avoiding any parallax errors.

Test Stand

Figure 5:
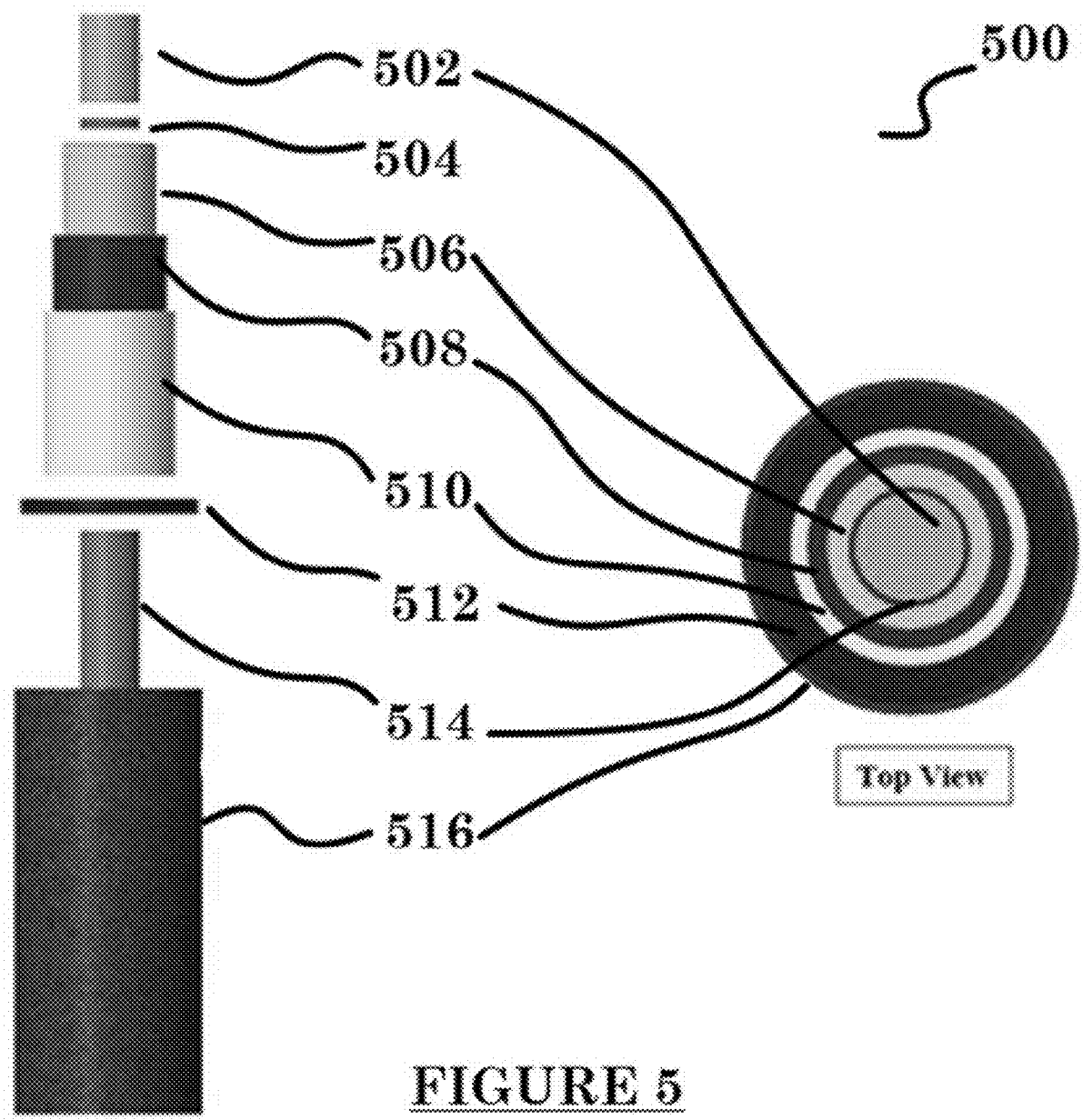
FIG. 5 shows a CAD drawing with side and top views of the test stand for $UO_2$.

A computer aided design (CAD) model of the modular test stand is shown in FIG. 5. Test stand 500 may include pellet 502, alumina disk 504 (not shown in top view), first Boron Nitride tube 506, first Molybdenum tube 508, second Boron Nitride tube 510, second Molybdenum tube 512, third Boron nitride rod 514, and boron nitride base 516. Boron nitride is identified to be the ideal material for building the test stand. Boron nitride is a white solid ceramic in the as-fabricated hot-pressed state, one suitable example being Combat boron nitride solids (test stand, grade AX05) from Saint Gobain. It can easily be machined precisely into complex shapes using standard carbide tooling. Some of the key properties are high thermal conductivity, high electrical resistivity, low thermal expansion, good thermal shock resistance, and chemical inertness, and it does not get wet by most molten metals.

Molybdenum is identified as the susceptor material for induction heating, which may be Molybdenum susceptor material available from Stanford Advanced Materials. It has a melting point of 2623° C. and an electrical resistivity of 38×10–6 Ωcm. Molybdenum will not reduce uranium dioxide because molybdenum has a Gibbs energy for oxidation of –332.875 kJ/mol, which is less negative than that of uranium at 1200° C. The susceptor is used to inductively heat the pellet up to 400° C. for uranium dioxide or 550° C. in the case of surrogate pellets to make it sufficiently electrically conductive to start the direct resistance heating.

Figure 6B:
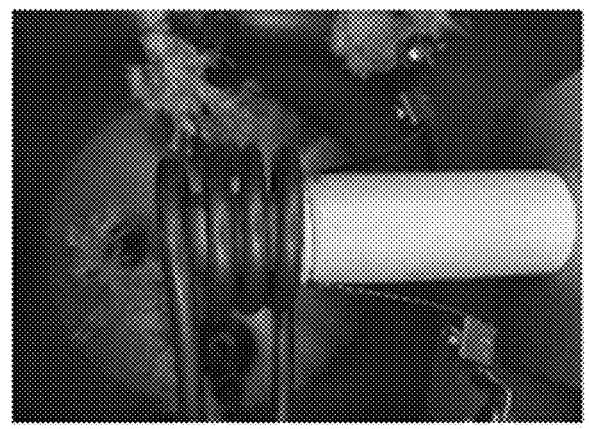
FIG. 6B shows an alternate view of FIG. 6A.
Figure 6A:
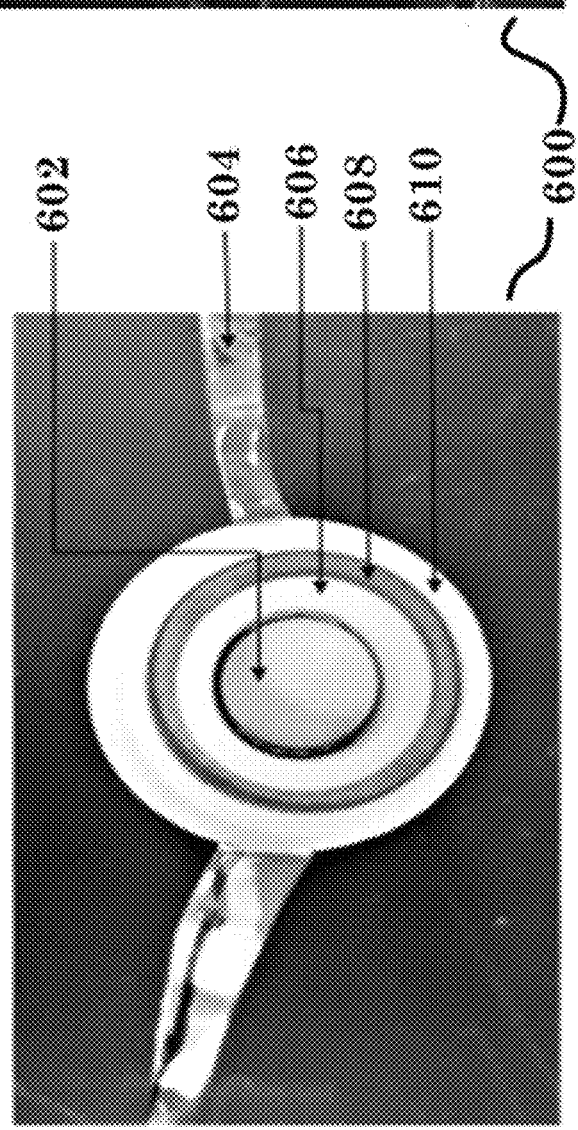
FIG. 6A shows one embodiment of a test stand assembly for cracking studies.

Nickel 201, which may be Nickel Foil 0.009" thick×50 mm wide×100 mm long, Alloy 201 from ESPI metals, is chosen as the electrode material because of its high melting point (1455° C.), high ductility (which permits bending for connections), and less negative Gibb's energy for oxidation (–217.625 kJ/mol) than uranium (–549.7 kJ/mol) at 1200° C., so it does not reduce the $UO_2$. The complete assembled test stand with surrogate pellet and nickel electrodes is shown in FIGS. 6A and 6B. FIG. 6A shows Boron nitride test stand 600, surrogate pellet 602, electrode 604, inner Boron nitride tube 606, Molybdenum susceptor 608, and outer Boron nitride tube 610. FIG. 6B shows an alternate view of FIG. 6A.

Oxygen Analyzer

It is essential to maintain a controlled oxygen atmosphere within the vacuum chamber for maintaining stoichiometry in $UO_2$ pellets at the target centerline temperatures. A Gen'Air oxygen pump from Setnag has been identified and connected to the system. It allows generating and measuring several different oxygen atmospheres. It is based on the principle of ionic conduction of zirconia. FIG. 7A shows one possible test setup and 7B shows the stainless steel vacuum chamber. FIG. 7A shows test setup 700, induction heater with water chiller 702, Setnag Oxygen Analyzer 704, Infrared Camera 706, Optical Camera System 708, Argon/Helium Gas source 710, vacuum pump 712, DC power supply 714, and computer 716 for running LabVIEW. FIG. 7B shows stainless steel vacuum 718 and Boron nitride test stand 600.

Results

Prior to using the completed test setup on $UO_2$ pellets, it was validated using ceria surrogate pellets. Ceria pellets having dimensions of 8.6 mm diameter and 10 mm height were tested inside the test chamber under vacuum at about 0.09 bar for induction heating followed by current controlled rapid direct resistance heating. The test was conducted in vacuum for avoiding oxidation of the molybdenum susceptor and nickel electrodes in presence of oxygen.

Figure 8:
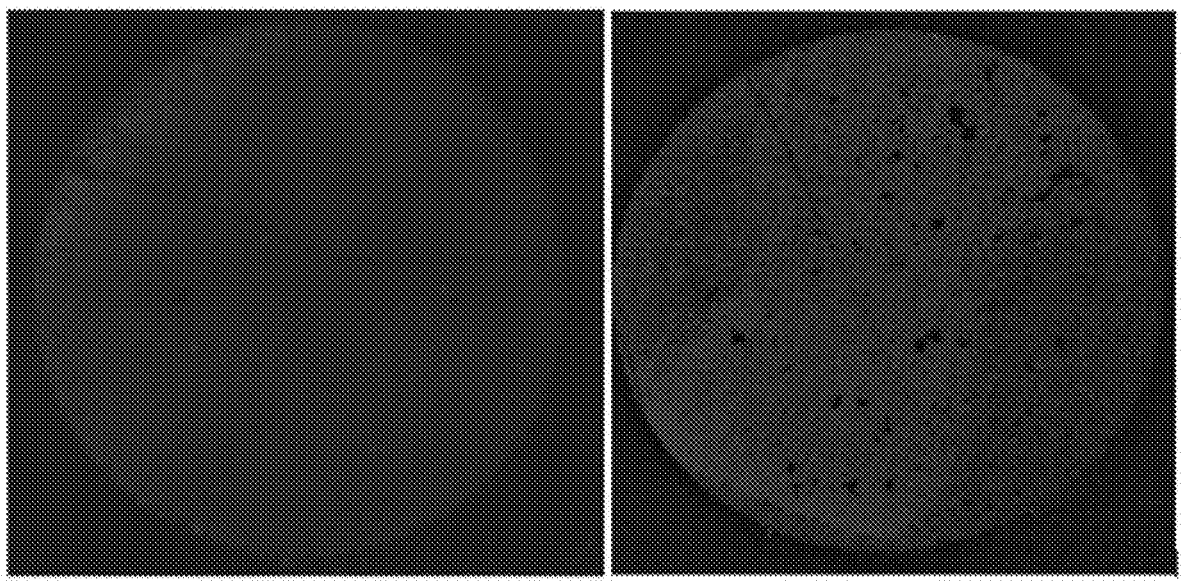
FIG. 8 shows diametral cracking in ceria by induction heating only. Black spots on the right picture are eroded graphite particles.

Prior to applying direct resistance heating, some basic tests were conducted to validate the induction heater and optical imaging system, see FIG. 8 showing diametral cracking in ceria by induction heating only. Black spots on the right picture are eroded graphite particles. In all these preliminary tests, the main objective was to find the optimum current required from the induction heater for preheating the surrogate ceria pellet. For the preliminary tests, an IRCON pyrometer was used to measure the temperature at a single point on the pellet surface instead of the FLIR IR camera because it was not yet available at that time. These tests were done at varying output current levels ranging from 250 to 300 A in a graphite susceptor, and the pyrometer recorded temperatures between 1150° C. and 1320° C. achieved solely using the inductive heater.

Temperature Profile and Cracking

After the induction heater—chiller was tested, it was necessary to test the complete setup along with direct resistance heating and infrared imaging. For that, the pellet was heated inductively via a molybdenum susceptor at 300 A for about 94 s, which heated the pellet to at about 700° C., which was measured by the infrared camera, making the ceria surrogate electrically conductive. At that point, the inductive heater was shut off, and 8 A and 180 V were supplied from the DC power supply for resistance heating. This current and voltage combination yielded a centerline temperature of ~2000° C. recorded by the factory calibrated FLIR infrared camera. The real-time temperature plots and the optical image of surrogate ceria pellet before and after cracking recorded by the dual imaging system has been shown in FIGS. 9 and 10, respectively.

Figure 9:
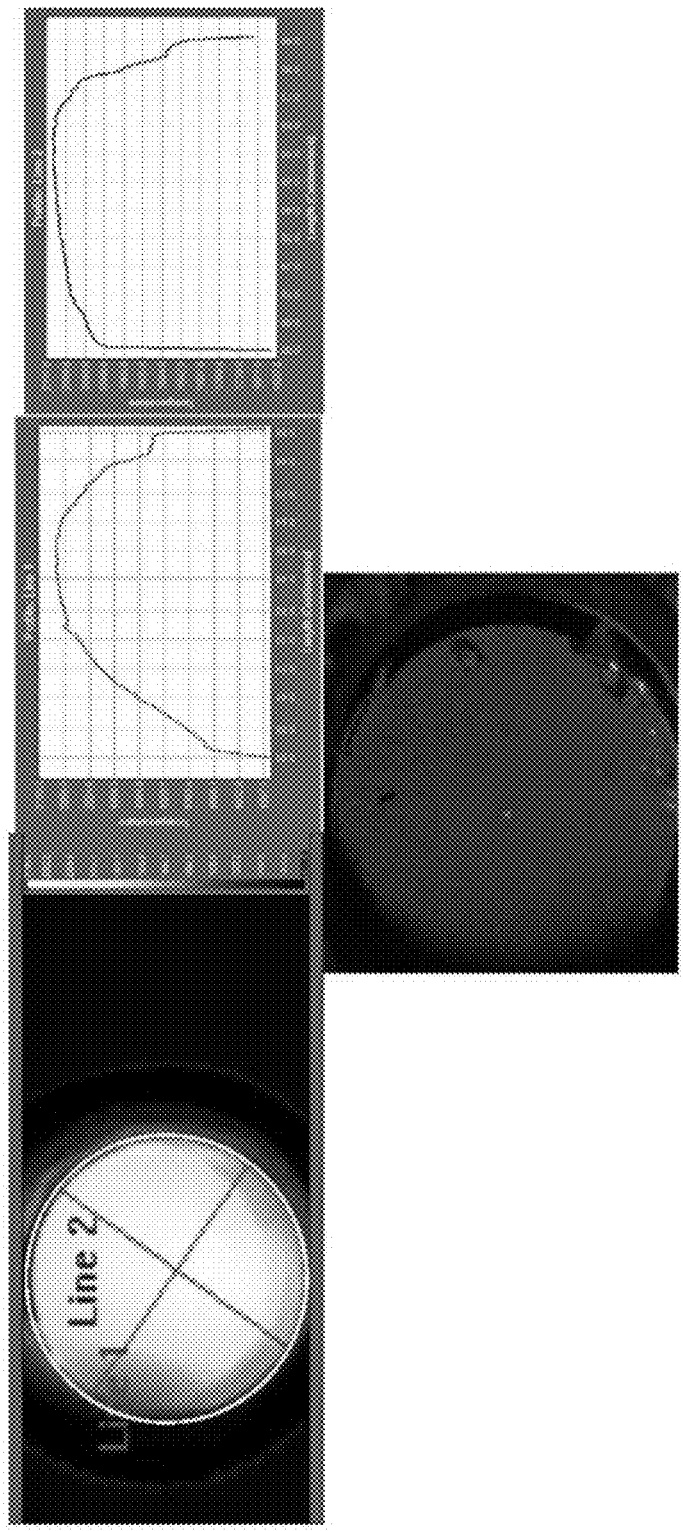
FIG. 9 shows Infrared and temperature plots of surrogate ceria pellet before cracking (above); optical image of surrogate ceria pellet before cracking (below).

In FIG. 9, the temperature plots are represented by Line 1 and Line 2, and the pellet is marked by white circle. Line 1 is drawn from the end to end through the electrodes, and Line 2 is drawn perpendicular to Line 1 from end-to-end on the non-electrode side. As expected, due to volumetric heat generation by means of resistance heating, the center of the pellet is hotter than the surface as seen during steady state operating conditions in a nuclear reactor. The temperature plots give us a gradient of –250° C. along Line 1 horizontal and about 180° C. Line 2 prior to cracking.

Furthermore, cracking was also observed at the end of heating cycle and at the onset of cooling. Temperature gradient is induced by turning off the resistive heating and flowing helium gas at a flow rate of about 500 sccm. The temperature plots and the optical image are shown in FIG. 10.

Figure 10:
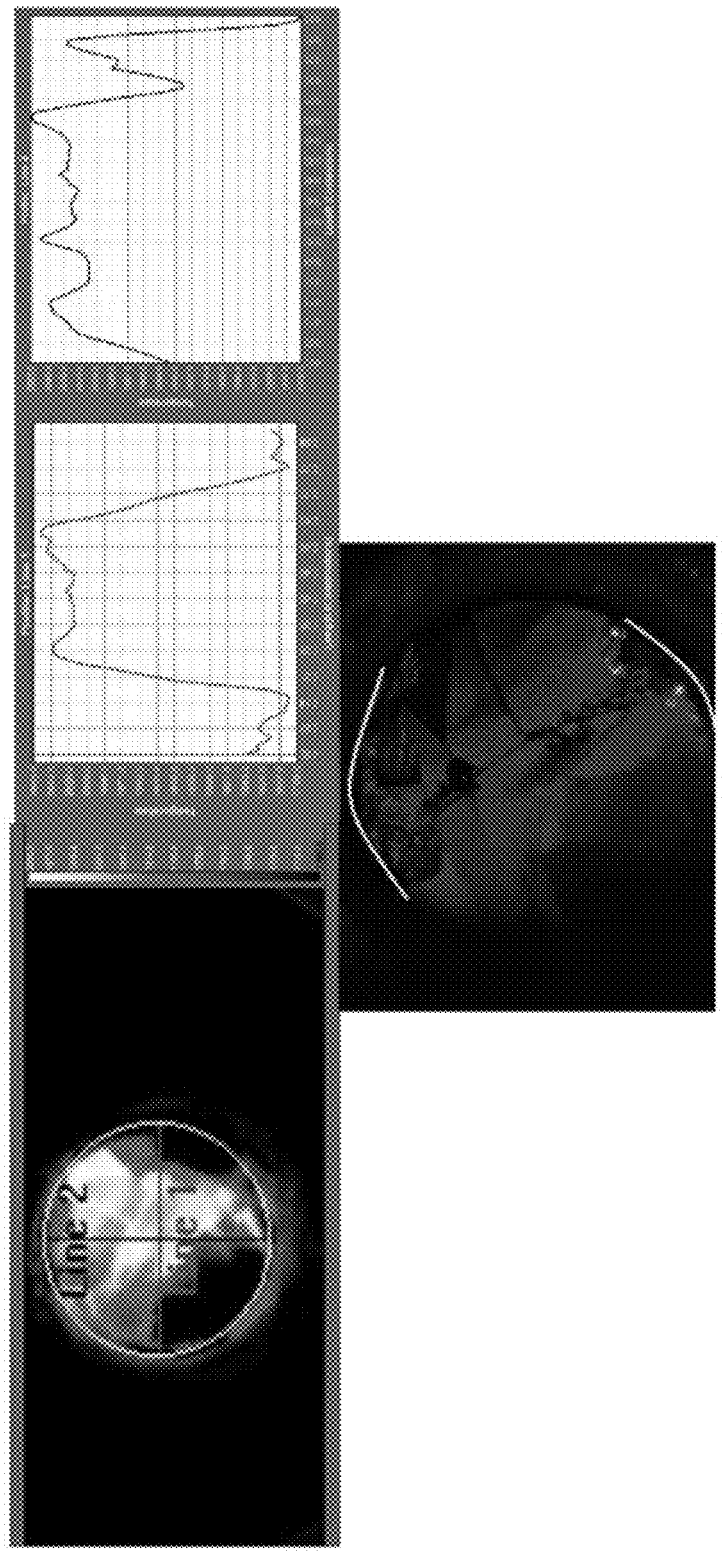
FIG. 10 shows infrared image and temperature plots of cracked ceria pellet (above); optical image of surrogate ceria pellet before cracking (below; white lines mark the electrodes).

The white circle in FIG. 10 outlines the pellet, and Line 1 and Line 2 represent the same region as in FIG. 9. This shows that the temperature plots differ when there is cracking. The cracks are representative of the depressions or discontinuity in the plots. Whenever the Line (one or two) profile encounters a crack, it is depicted by the drop-in temperature from the plot. This is due the fact that the cracks get filled by air or vacuum, which being a poor conductor of heat leads to the temperature drop. Moreover, at regions of cracks or fracture, there is removal of material or surface, which also leads to the temperature discontinuity in the plots. At this point, the BISON model for cracking of $UO_2$ is a work in progress. Cracking typically occurs at a temperature gradient of at least 150° C. In these experiments, there is a temperature gradient of about 200° C. along the electrode and non-electrode directions on the pellet, which verifies that the experimental temperature profile matches the literature for cracking in the bulk of the pellet. The non-uniform crack patterns shown in FIG. 10 are representative of cracking of LWR fuel pellets. See, S. C. S. Faya, *A Survey on Fuel Pellet Cracking and Healing Phenomena in Reactor Operation*, Instituto de Pesquisas Energéticas e Nucleares Sao Paulo-Brasil, INIS, 1981.

Figure 11:
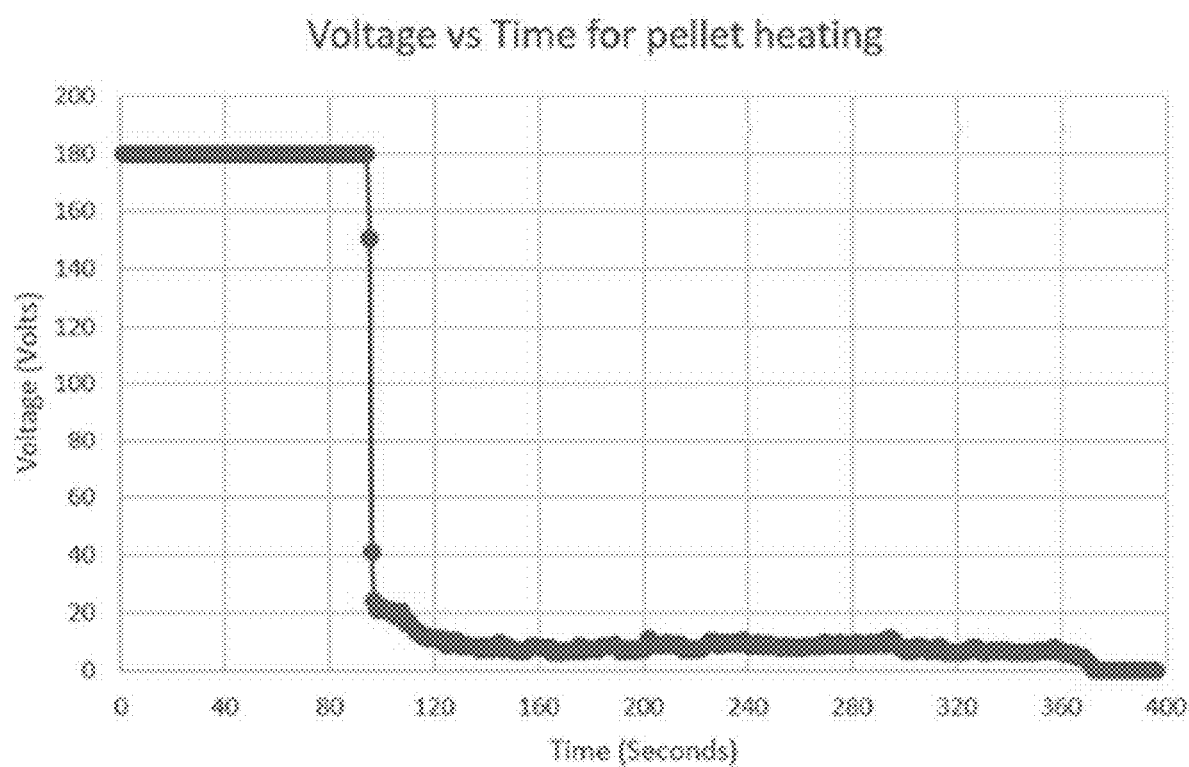
FIG. 11 shows a graph of voltage versus time during pellet heating.

The electrical conductivity in ceria was determined from the change in voltage and current as recorded from the DC power supply. At the beginning of induction heating, DC power supply was set to 180 V and a minimum current of 1 A. Since ceria behaves as an insulator at room temperature, the high resistance does not allow any flow of current. As the ceria pellet heats up inductively, after 94 s at about 700° C., voltage begins to decrease rapidly, which indicates that the electrical resistance has dropped sufficiently to allow the flow of current, see FIG. 11, which provides a graph of voltage versus time during pellet heating.

All the useful data were collected and recorded via a data acquisition system running on LabVIEW, available from National Instruments, LabVIEW. The parameters recorded by the program are outlined in Table II, see FIG. 12. This ensures a good quality control and helps in retrieval and reuse of the data for future work.

In addition to ceria, a second ceramic material, yttria-stabilized zirconia (YSZ) was also tested for cracking as a surrogate. The high energy bandgap of 5 eV for YSZ compared to 3.5 eV for $CeO_2$ demanded a higher voltage (>300 V) and current (11 A) from the resistive power supply to get comparable centerline temperature estimation, which resulted in melting of the nickel electrodes. Thus, this failed test case ruled out YSZ as a surrogate for $UO_2$ to study cracking.

The experimental setup for studying cracking of fuel pellets under transient temperature conditions has been built and validated. The primary purpose of the setup is to be able to conduct out-of-pile volumetric heating of a single fuel pellet (in contrast to fuel pellets in a reactor, which are stacked in a rod). This disclosure is instrumental in generating temperature profiles on the pellet and collect useful information such as voltage, current, optical, and infrared images, which will be instrumental in validating BISON models being developed at the Idaho National Laboratory in the context of the Department of Energy's initiative for restarting the Transient Test Reactor (TREAT). This would help in studying the fuel behavior during transients under reactivity-initiated accident (RIA) scenarios, which would contribute to enhanced fuel performance.

The system can be effectively used for studying cracking and temperature dependent mechanical properties of other ceramics or metals as well, based on the materials' thermoelectric compatibility with the current instrumentation that is on the system. FIG. 13 shows a cross-section of a test strand.

A variety of normal operation and accident scenarios can generate thermal stresses large enough to cause cracking in ceramic fuel pellets. Cracking in fuel pellets can lead to reduced heat removal, higher centerline temperatures, and localized stress in the cladding—all which impact fuel performance. It is important to experimentally characterize the thermal and mechanical behaviors in the pellet both before and after cracking, which would help to improve cracking models in fuel performance codes such as BISON.

However, in-reactor observation and measurement of cracking are very challenging due to the harsh environment and design of the fuel rods involved. Recently, an experimental pellet-cracking test stand was developed for separate-effects testing of pellet cracking under normal operations and accident temperature conditions using thermal imaging to capture the pellet surface temperatures in order to evaluate the thermal stresses and optical imaging to capture the evolution of cracking in real time. Experiments were performed using depleted uranium dioxide ($UO_2$) pellets, which are useful for collecting valuable data for development and validation of cracking models. A combination of induction and resistance heating was used to create thermal gradients similar to those seen in a reactor environment. Characterization of the pellets was conducted both before and after cracking. The cracking patterns are moderately different from those expected in a typical reactor because of the variations in the thermal conditions and pellet microstructures. However, when the actual conditions of these experiments are reproduced in computational models with sufficient precision, such out-of-pile testing on $UO_2$ pellets provides relevant data for modeling purposes.

The behavior of ceramic fuel is significantly affected by fracture. Early in the life of the fuel, fracture is primarily caused by thermal stresses. The fission process in the cylindrical fuel pellets causes volumetric heating that, in conjunction with the forced convective cooling on the exterior of the fuel rod, results in a parabolic temperature profile. The significant tensile stresses that this temperature profile causes on the pellet exterior result in crack initiation in fresh fuel. Crack closure and reconstitution happen under steady-state conditions.

Typically, nuclear fuel rods are fabricated with initial pellet clad gap to allow space for radial thermal expansion and swelling due to fission products during operation. When the fuel rod power rises, cracking occurs in pellets because of the thermal stresses induced due to the radial temperature gradients, leading to the formation of crack areas in the pellets. These newly formed cracks on the pellet surface are remunerated by reduction in gap area, which increases the apparent pellet diameter. This phenomena is known as relocation. Changes in gap size during fuel irradiation primarily affect fuel rod performance including fuel temperature, fission gas release, and pellet-clad mechanical interaction (PCMI). See, B. BRZOSKA et al., "Influence of Pellet-Clad-Gap-Size on LWR Fuel Rod Performance," *Transactions 5th SMiRT Conf., Berlin, Germany,* 1979, p. D2/1, *International Association for Structural Mechanics in Reactor Technology* (1979) and D. D. LANNING, "The Possible Impact of Fuel Pellet Cracking on Inferred Gap Conductance and Fuel Stored Energy," *Nucl. Technol.,* 56, 3, 565 (1982); https://doi.org/10.12.182/NT82-A32915. For modeling relocation or gap sizes in fuel performance codes, it was assumed that there is a certain degree of gap reduction at specific power levels. See, M. P. BOHN, "FRACAS—A Subcode for the Analysis of Fuel Pellet-Cladding Mechanical Interaction," TREE-NUREG-1028, *Idaho National Engineering Laboratory* (1977), ENTROPY LIMITED, "SPEAR-BETA Fuel Performance Code System Volume 1. General Description," *EPRI NP*-2291, *Vol. 1, Final Report, Electric Power Research Institute* (1982), and K. ITO et al., "A Comparison of FEMAXI-III Code Calculations with Irradiation Experiments," *Res. Mech.,* 2, 109 (1981).

Cracking directly impacts fuel relocation, which eventually leads to reduction of fuel temperature. According to Oguma's finite element analyses and experimental studies, it was observed that rod power and cracking are directly related. See, M. OGUMA, "Cracking and Relocation Behavior of Nuclear Fuel Pellets During Rise to Power," Nucl. Eng. Des., 76, 1, 35 (1983); https://doi.org/10.1016/0029-5493(83)90045-6. The rod power level was found to range from as low as 30 W/cm to a maximum of 400 W/cm.

For fuel performance codes to be predictive under a wide range of operating conditions, it is important that they faithfully represent all aspects of fuel system behavior via physics-based models. Because of their important role in regard to fuel behavior, improving the models' capability to represent fracture is of high priority in developing such codes. Although significant advances have been made in fracture modeling, limited data available on cracking initiation and propagation are available for direct validation of these models. A U.S. Department of Energy initiative is currently supporting multiple experimental efforts (including the one described herein) to provide improved data for the validation of these models, specifically targeting the BISON code. These include out-of-reactor experiments as well as a series of planned experiments in Idaho National Laboratory's Transient Reactor Test Facility.

Developing an experiment that permits capturing of fracture initiation and growth in light water reactor (LWR) fuel is challenging due to difficulties in both replicating the thermal conditions experienced by the fuel in the reactor and instrumenting the experiment in a way that permits observation of crack growth without compromising those representative conditions. Using resistive heating to replicate the volumetric heating that occurs in the nuclear reactor is attractive because it permits more extensive instrumentation than would be possible in an in-reactor experiment. This approach is used in the work described herein. One major challenge related to resistive heating is that uranium dioxide ($UO_2$) is a semiconductor with very high electrical resistivity at low temperatures. When its temperature is raised, it becomes much more conductive, permitting resistive heating. The experimental apparatus used in this work employs inductive heating to raise the temperature of the $UO_2$ prior to performing resistive heating.

The primary objective of the research efforts was to build an experimental setup for capturing real-time cracking data such as radial temperature distribution and cracking simultaneously in a single out-of-pile $UO_2$ pellet under laboratory-simulated transient temperature conditions by using direct resistive heating for volumetric heat generation in the pellet. The data collected will be used in the validation of $UO_2$ cracking models in BISON. In the meantime, the experimental results have been used for successfully validating two-dimensional (2-D) $UO_2$ cracking models in BISON. See J. Y. YEH et al., "Coupled Physics Simulation of Fracture in Nuclear Fuel Pellets Induced by Resistive Heating," *J. Nucl. Mater.*, 553, 153004 (2021); https://doi.org/10.1016/j.jnucmat.2021.153004. The three-dimensional (3-D) cracking models' validation is currently a work in progress.

In the late 1970s, resistive heating was used in a series of experiments at Argonne National Laboratory. See, C. R. KENNEDY et al., "Cracking and Healing Behavior of $UO_2$ as Related to Pellet-Cladding Mechanical Interaction," *Interim Report, Electric Power Research Institute* (July 1976); ANL-76-110, *Argonne National Laboratory Materials Science Division* (October 1976). In those experiments, two power supplies operating in parallel were used to pass current axially through a stack of pellets to raise them to a temperature high enough for them to become conductive, and then enough current was applied to obtain the desired heating. A low-voltage, high-current power supply (300 V and 300 A) was used in tandem with a high-voltage, low-current power supply (2500 V and 10 A). A high voltage was applied for the initial preheating of the pellets. When the temperature increased and the resistance decreased, the current increased until it reached a limiting value of 10 A, (until the voltage decreased to 300 V), at which time the system provided a constant 300 V with a current of up to 310 A. This system provided rapid heating to replicate reactivity-initiated accident conditions. Cooling on the outer surface of the pellets was achieved by flowing cooled helium past the pellet stack. Three pyrometers were used to capture temperatures at different ranges, such as 400° C. to 1000° C., 900° C. to 1600° C., and 1500° C. to 3000° C. The configuration of that experiment did not permit direct observation of crack formation, but acoustic emission techniques were used to detect whenever crack propagation occurred.

Along these lines, in a separate study by Oguma, out-of-pile experiments and analyses were conducted for understanding pellet thermal deformation, and in-pile analyses were performed to resolve pellet relocation behavior of fuel rods when under operating conditions. For evaluating cracking behavior of the pellet prior to PCMI, the on-power diameter was measured by implementing an electrically heated PCMI simulation of the fuel rod assemblies.

The test setup comprised simulated fuel rods with a tungsten rod in the center for direct resistance heating, diameter and dimension change measuring devices, data acquisition systems, and power controller. The test fuel rod consisted of a fully annealed Zircaloy-2 cladding (outer diameter=14 mm), hollow $UO_2$ pellets [density=93% theoretical density (TD)], and a tungsten heater (diameter=5 mm). The as-fabricated pellet-clad gap sizes were set at 60, 100, and 150 µm as an experimental parameter. It was observed that pellet cracking started at a low rod power of 30 W/cm. This was due to the sharper temperature distribution in the centrally heated pellet, which was more toward a hyperbolic shape rather than parabolic. The number of cracks was found to vary from 2 to 16 at minimum and maximum power levels of 30 and 400 W/cm, respectively.

Experimental Setup

The current disclosure utilizes a significantly different configuration from that of the Argonne National Laboratory experiments, allowing for imaging of the top surface of the fuel pellet in order to observe radial crack formation intersecting the pellet surface. See S. PATNAIK et al., "Experimental System for Studying Temperature Gradient Driven Fracture of Oxide Nuclear Fuel Out of Reactor," *Rev. Sci. Instrum.*, 91, 3, 035101 (March 2020); https://doi.org/10.1063/1.5119361. Instead of passing the current axially through the pellets as in the previous work, electrodes were placed on the sides of a single pellet to pass the current transversely across it. This allowed for an unobstructed view of the top surface of the pellet. A unique dual-imaging technique was utilized in which an infrared camera captured the pellet's full-field temperature gradient while simultaneously and in real time an optical camera system captured physical images of cracks. Also, rather than using a high voltage when performing the initial preheating, the present work employs induction heating as a more controlled method for raising the pellets to a temperature at which they become sufficiently electrically conductive.

The experimental apparatus described in Id. That was developed specifically for these studies permits in situ imaging of cracks visible on the fuel pellet's top surface and measures the corresponding temperature profiles. This is achieved through the dual-imaging system that captures both optical and thermal images of the pellet surface. See Id. To simplify the process of calibrating and verifying the instrumentation used in these experiments, it was very helpful to use a nonradioactive surrogate material for the fuel pellets. Ceria ($CeO_2$) has been widely used in the nuclear industry as a nonradioactive surrogate for $UO_2$, and because its relevant properties were found to be sufficiently similar to those of $UO_2$, it was used as a surrogate for the fuel pellets in the initial phases of the present study. See, S. PATNAIK et al., "Evaluation of Ceria as a Surrogate Material for $UO_2$ in Experiments on Fuel Cracking Driven by Resistive Heating" (submitted for publication). although the present disclosure focuses solely on experiments on $UO_2$.

Experimental Conditions for $UO_2$ Pellet Fracture

Pellet Fabrication

A series of tests was performed, each on an individual pellet with varying conditions. The depleted $UO_2$ pellets studied herein were fabricated at Texas A&M University with an average TD of 93.74%, an average diameter of 10.98 mm, and an average height of 9.53 mm. The pellets were sintered at 1790° C. for 24 h in Ar-5% $h_2$. The furnace used for sintering was from Materials Research Furnaces, LLC, Serial Number 1211, and is water cooled, tungsten element, tungsten shielded. Ultra-high-purity (UHP) argon with 5% hydrogen was used to reduce the $UO_2$ and UHP argon to sinter the pellets. There were several bottles used; two bottles of each gas were used and connected in parallel to avoid running out of gas during a sintering. There were four bottles always connected: two UHP argon bottles and two UHP Ar-5% $H_2$ bottles. There was no mixing of any gases; either one of the gases was selected at one time. The pellets sintered at these conditions were predicted to be stoichiometric $UO_{2.00}$ when the O/U ratio was computed using the CALculation of PHAse Diagrams (CALPHAD) model proposed by Besmann et al. See, T. M. BESMANN, J. W. McMURRAY, and S. SIMUNOVIC, "Application of Thermochemical Modeling to Assessment/Evaluation of Nuclear Fuel Behavior," *CALPHAD*, 55, 47 (2016); https://doi.org/10.1016/j.calphad.2016.04.004.

Dual Heating/Imaging

Uranium dioxide pellets were mounted on a custom-built modular test stand machined from Combat® Machinable Ceramics Grade AX05 highest-purity hBN available at 99.7%+ boron nitride (BN), which serves as an electrical insulator but is still highly thermally conductive. See, "Combat Boron Nitride Solids," |Saint-Gobain Boron Nitride; https://www.bn.saint-gobain.com/sites/imdf.bn.com/files/combat-bn-solids-ds.pdf (current as of Feb. 17, 2021). Boron nitride is easily machinable, and the modular design provides the flexibility to connect electrodes and feedthroughs while setting up the test stand. The mechanical tolerances in the test stand also help to address and accommodate the thermal expansion and heat transfer in the pellet while undergoing resistive heating. A custom-made molybdenum tube was used for the susceptor material, which was custom manufactured by Stanford Advanced Materials with UHP Mo content greater than or equal to 99.95%. A schematic of the test stand with all the components present is shown in FIGS. 5, 6A and 6B. The dimensions of the important components of the test stand are outlined in Table 3, see FIG. 14.

In all the tests the vacuum chamber was first evacuated using a rotary vane vacuum pump and then filled with helium gas that continued to flow through the experimental chamber at a rate of 200 standard cubic centimeters per minute. The experimental chamber was a custom-built stainless steel ultra-high-vacuum six-way cross with 8-in. nominal outer diameter, with 10-in. outer diameter, with five Conflat flanges and one ISO 200 stand that acted as the door for accessing the test stand inside the chamber.

The oxygen partial pressures of the chamber atmosphere were measured by a SETNAG Gen'Air high precision oxygen analyzer and found to be in the range of $10^{-13}$ to $10^{-14}$ atm at 1200° C. in a reducing atmosphere. Since the very low oxygen potential in the gas means a very low oxygen content, it will not change the pellet O/U ratio. Therefore, the pellet retains its stoichiometry during the test as well as predicted by Besmann et al.

During each test, the pellets first underwent induction heating followed by direct resistance heating. The tests began with the direct-current power supply for resistance heating being set at 0.5 A and 120 V while the pellet was heated via a molybdenum susceptor using induction heating at 200 A. This was done to raise the pellet to a threshold temperature high enough for it to become sufficiently conductive for resistive heating. The electrical conductivity of $UO_2$ increases sharply with increasing temperature, see J. L. BATES, C. A. HINMAN, and T. KAWADA, "Electrical Conductivity of Uranium Dioxide," J. Am. Ceram. Soc., 50, 12, 652 (December 1967); https://doi.org/10.1111/j.1151-2916.1067.tb15021.x, and the pellets were found to become sufficiently conductive to produce a measurable voltage drop once they reached an average temperature of about 460° C., which in all the tests occurred after less than 10 s of induction heating as shown in Table IV, see FIG. 15. Once a voltage drop was detected, the current was quickly increased to 1 A and then increased stepwise at 0.5-A increments, along with certain hold times, until a number of different peak currents (e.g., 4, 5, 6, and 8 A) were reached for a given test. This was done to achieve different peak temperatures and to check for any differences in cracking patterns at those resultant currents and peak temperatures. As expected, the pellets reached different peak temperatures with increasing current; however, the characteristics of the observed cracking did not differ significantly from one test to another.

Results and Discussion

Observed Crack Initiation

In all the tests, the first evidence of cracking was observed when the current was between 3.5 and 4 A supplied from the resistance heating power supply. The nominal hold times at each power level and the hold times until cracking for tests with peak currents of 4 and 8 A are outlined in Table IV, see FIG. 15. The maximum deviation in the hold times is 2 s for each hold at each power ramp.

The test conditions, temperature measurements, cracking patterns, and pellet fabrication details for each of the tests are summarized in Table V, see FIG. 16.

Experiments were conducted at different peak current levels to study any differences in cracking patterns and radial temperature profiles. Three tests were performed at both the 4- and 8-A peak current values whereas one test each was conducted at intermediate peak currents of 5 and 6 A. Tests were conducted at higher peak current values greater than 4 A to check for any change in cracking patterns at higher current values. However, no significant change was observed in the cracking patterns at those higher power levels beyond what was observed when cracking first initiated at the 3.5- to 4-A power level. The only major difference in behavior under higher power is that higher peak temperatures were attained, which are reported in Table V, see FIG. 16. FIG. 17 shows a current-voltage-time plot for one of the tests. Voltage decreases sharply when the pellet becomes sufficiently conductive from the inductively heated susceptor, and the ramp current from the resistive heater induces volumetric heating in the pellet, creating a radial temperature gradient within the pellet.

Infrared and Optical Imaging

An infrared camera from FLIR Systems, Inc., has a very high thermal sensitivity of <20 mK, so even Slight changes in surface temperature during the test are captured. Full-field temperature distributions for $UO_2$ pellets bearing pellet identifiers U4-50, U5-26F, and U5-22C both before and after cracking for horizontal and vertical directions are shown in FIGS. 18 and 19, respectively. Infrared images for U4-50 both before and after cracking were captured after 305 and 339 s of resistive heating, respectively. Similarly, for U5-26F, infrared images both before and after cracking were captured at 168 and 195 s, respectively. Along those same lines, for U5-22C, infrared images both before and after cracking were captured after 150 and 175 s, respectively. The infrared and optical images of the pellets both before and after cracking are shown in FIGS. 20 and 21 for selected cases involving low, intermediate, and high peak currents (4, 6, and 8 A).

To facilitate comparisons among the various experiments and between simulation results, temperature profiles for each of these experiments were extracted along two lines: one passing horizontally through the electrodes (shown in green in the infrared images in FIGS. 20 and 21), and one perpendicular to that line in the vertical direction in this image (shown in blue in those same figures). These temperature profiles are shown in FIGS. 18 and 19 for the same three experiments shown in FIGS. 20 and 21.

From both the full-field and line plots, the temperatures are seen to be smooth and continuous prior to cracking. However, once cracking occurs, significant discontinuities arise at the crack locations due to the significant thermal and electrical resistance at the gaps. The average radial temperature differences prior to cracking were measured to be 201.6° C. and 270° C. along the horizontal and vertical lines, respectively. Prior to cracking, there is a larger difference between the centerline and outer-surface temperatures along the vertical line from what is observed along the horizontal line. However, this pattern reverses after cracking primarily since the direction of the current changes after crack formation. Cracking causes change in the electrical resistance in the pellet and the direction of the flow of the current as well. Since the current follows the path of least resistance, the temperature distribution across the pellet also changes; i.e., the temperature difference along the horizontal line becomes greater than what is observed along the vertical line. The infrared data show that cracks initiate when the difference between the peak (centerline) and surface temperature is on average 221° C. and 163.5° C. along the horizontal and vertical lines, respectively.

It is to be noted that the pellet peak temperatures were measured around the center of the pellet, which were also the centerline temperatures before cracking happened as seen in FIG. 18 at a and FIG. 19 at a along the horizontal and vertical directions of radial temperature measurements in the pellet, respectively. However, at the onset of cracking, this changes. Cracking is an extremely fast process, and as soon as cracks initiate and propagate, the temperature distribution changes significantly across the pellet. The pellet peak temperatures are no longer concentrated particularly at the center of the pellet; rather, they are distributed at various "hot spot" portions in the pellet. The main reason for this observation is that after cracking the electrical contact of the pellets with the electrodes changes leading to imperfect contact, which is opposite of the way it was prior to cracking. This improper contact results in nonuniform current flow in the pellet. As a result, the parts of the pellet that are in good contact have good current flow leading to higher temperature distribution in those areas only relative to the other parts of the pellet that are in improper electrical contact with the electrodes and thus relatively lower temperatures as well.

More importantly, it was observed that cracks first initiate when the pellet peak temperature is about 1600° C. and that the radial temperature differences obtained in these experiments (200° C. average) are much less than what is observed in a typical reactor (700° C. to 800° C.). The primary reason is because of the way the pellet is cooled. The pellet is cooled by means of turning off the resistive heating power supply, resulting in significant radiative heat losses from the top radial surface of the pellet into the chamber and purging helium (0.20 L/min) inside the vacuum chamber instead of passing it right over the pellet. The primary objective of the study was to obtain radial cracking images and the radial temperature distribution on the pellet surface simultaneously in situ for validation of $UO_2$ cracking models. Therefore, there was a need to have an unobstructed view of the pellet surface. So, it was not possible to flow helium gas directly on top of the pellet to cool the surface using any form of feedthrough or instrumentation that will not block the view of the pellet radial surface from the top. Moreover, the helium purged inside the chamber was also at a very low flow rate so as not to damage the oxygen analyser, which had a maximum flow rate capacity of 0.20 L/min for measuring oxygen partial pressures at the optimum accuracy levels.

An additional factor responsible for the low $\Delta T$ and higher cracking temperatures was the low convective and radiative heat transfer coefficients. The layers of the annular cylinders and gaps in the test stand surrounding the pellet, along with the natural convection, act as a set of resistors in series. By calculating the Nusselt number, Prandtl number, and Grashof number, the total heat transfer coefficient was found to be significantly low, which was responsible for causing the pellets to crack at relatively low $\Delta T$ and higher peak temperatures than typical LWRs, see S. PATNAIK, "Separate Effects Tests for Studying Thermal Gradient Driven Cracking in $UO_2$ Pellets Undergoing Resistive Heating," *PhD Dissertation, University of South Carolina* (April 2021).

Another interesting observation from the infrared images was how cracking affects the temperature profiles observed on the top of the pellet after cracking. Prior to cracking, the spatial temperature distribution is continuous, with a hotter centerline temperature and cooler surface temperature prior to cracking. However, as cracks initiate and propagate, which is an extremely fast process, the temperature profile changes rapidly and develops strong discontinuities. The thermal images show the pellets being divided into zones that have relatively uniform temperatures within each zone, with large temperature jumps on the boundaries of these zones. Typically, one of these zones becomes hotter than the others, separated by the major primary crack along the pellet diameter. This behavior is largely due to the high resistance to heat transfer caused by the cracks. The large temperature differences between these zones causes large differences in the thermal and electrical conductivity, which is, in turn impacted by cracking and temperature. See Bates et al. and S. GIORDANO, "Electrical Behaviour of a Single Crack in a Conductor and Exponential Laws for Conductivity in Micro Cracked Solids," Int. J. Appl. Electromagnet. Mech., 26, 1-2, 1 (2007); https://doi.org/10.3233/JAE-2007-815.

Cracking also affects the electrical fields because it causes poor contact between cracked zones and between the electrodes and the pellet. It should be noted that in multiple ways, the cracking pattern and temperature profiles obtained in these experiments differ from what would be observed in a typical reactor environment. Some key differences are as follows: 1. The pellets tested in this study on cracking have a low average TD of 93%, which is lower than the 95% to 96% TD typically observed in standard commercial reactor fuels. Density varies directly with electrical conductivity. Thus, a low-density pellet has lower electrical conductivity, which means that under resistive heating, it takes longer to attain the peak temperatures needed for cracking. See, R. K. WILLARDSON, J. W. MOODY, and H. L. GOERING, "The Electrical Properties of Uranium Oxides," *NSA*-11-001710, *Battelle Memorial Institute* (1956).

2. Typically, in a LWR, the pellet surface is about 400° C. to 500° C., and the centerline temperature is about 1200° C. ($\Delta T=700$° C. to 800° C.) while operating under steady-state conditions. See, L. VAN BRUTZEL, R. DINGREVILLE, and T. J. BARTEL, "Nuclear Fuel Deformation Phenomena, Chapter 2," *NEA/NSC/R*(2015)5, *Organisation for Eco-* nomic Co-operation and Development, Nuclear Energy Agency, Nuclear Science Committee. Immediately after the fuel rod power increases and before any significant swelling or creep can occur, a network of cracks due to thermal stresses is induced by the radial high-temperature gradients (a few hundred degrees Celsius per centimeter). See, D. R. OLANDER, "Fundamental Aspects of Nuclear Reactor Fuel Elements," *TID-26711-P1, Energy Research and Development Administration* (1976). However, in the present study, by means of resistive heating and volumetric heat losses, an average maximum radial temperature difference of 200° C. was generated in the pellet. This ΔT was used to quantify the corresponding linear heat rate (LHR) by using the equation q'=4·π·k·ΔT, where q' is the LHR (in W/cm), k is the thermal conductivity (in W/m·K), and ΔT is the temperature difference. Based on this calculation, for the present study it was found out that the LHR for ΔT=200° C. was 178 W/cm and the number of radial cracks observed was between two and four for all the pellets. This matches well with the predictions made by Oguma where the maximum number of cracks was four for LHRs ranging from 0 to 200 W/cm.

This temperature difference of 200° C. was enough to create thermal stresses in the pellet, causing it to crack. This aligns with the fracture model suggested by Faya in S. C. S. FAYA, "A Survey on Fuel Pellet Cracking and Healing Phenomena in Reactor Operation," *Instituto de Pesquisas Energeticas e Nucleares Sao Paulo—Brasil* (October 1981), as well as the preliminary BISON simulations. See, Williamson et al. Both references concluded that a temperature difference of 150° C. was sufficient to induce thermal stresses and initiate cracking in the fuel pellet.

1. As previously mentioned, because of the way that the current is passed transversely across the pellets, the temperature contours in these experiments are oblong, which results in stress concentrations and fracture initiation near the electrodes, which differs from the expected behavior in the LWR environment, where radial cracks would be spread more uniformly around the pellet periphery.

2. The high-temperature gradients of the pellets in fresh LWR fuel are caused by volumetric heating and radial heat rejection. However, over the life of the fuel, the microstructure changes in a nonuniform way due to radial variations in temperature, grain size, porosity, local burnup, and fission product chemistry. See, Z. HIEZL, "Processing and Microstructural Characterization of $UO_2$-Based Simulated Spent Nuclear Fuel Ceramics for the UK's Advanced Gas-Cooled Reactors," *PhD Thesis, Imperial College of London* (2015) and J. SPINO, K. VENNIX, and M. COQUERELLE, "Detailed Characterization of the Rim Microstructure in PWR Fuels in the Burn-Up Range 40-67 GWd/tM," *J. Nucl. Mater.*, 231, 3, 179 (1996); https://doi.org/10.1016/0022-3115(96)00374-1. This study is relevant to fresh LWR fuel but does not address burnup dependent phenomena that would affect late-life fracture behavior.

Despite the differences between the environment and conditions created by the resistive heating tests and the nuclear reactor, the results of the current research effort still provide data that are useful for validation of computational models. As long as the computational models can replicate the experimental environment, these experiments can be used for validation of those models. The experimental data have been used in a parametric study conducted by Yeh et al. encompassing electrical conductivity and heat transfer coefficients where the temperature and cracking data from these experiments were successfully implemented in validating the 2-D cracking model in BISON.

In all eight experiments, it was observed that the temperature gradient across the nonelectrode side (vertical blue line) was higher than across the electrodes (horizontal green line) prior to crack formation as seen in FIGS. 20 and 21. This temperature gradient resulted in every case in the formation of a major radial crack that extended across the pellet diameter, with smaller radial cracks branching out of it. Video generated by stitching optical images captured during the tests at every 1-s interval shows that the cracks originated at either one of the electrodes before propagating radially across the pellet as seen in FIG. 22. The optical images immediately prior to cracking, at the point of crack initiation, and after propagation are shown in FIG. 22 for pellet U4-50.

The time stamps on the optical images were used to determine the current and voltage at the exact moments when cracks initiated. After comparing the optical images of cracking with the thermal data, the first cracking event was confirmed to have occurred at about 1600° C. centerline temperature, when the current was between 3.5 and 4 A.

FIG. 23 clearly shows that in addition to the radial cracking observed on the top surfaces during the experiment, there is also significant axial cracking, typically manifested as a single major crack at the pellet midplane. FIG. 23 at a through 8*h* show side views of the pellets after being removed from the test chamber. Since the current is passed transversely across the pellet, there is significant spatial variation in the current density across the pellet cross section. Preliminary 2-D BISON simulations conducted by Yeh et al. show that the temperature contours of the experiments conducted in this disclosure were oblong as opposed to the circular shape that would be seen in a reactor environment.

Because of the nature of these oblong temperature contours and the resulting thermally induced stresses, Yeh et al. predicted that most radial cracks would initiate near the electrodes and propagate inward while axial cracks would initiate at azimuthal locations at a 90° angle with respect to the electrodes.

These 2-D simulations are cross-section models that do not capture axial temperature variations. Because there is a path for convective as well as radiative heat loss from the top surface of the pellet into the test chamber, the axial thermal gradients could be significant. The maximum heat loss in the pellet is from the top, which creates an axial temperature gradient. As a result, the top of the pellet is cooler than the bottom. The actual amount of heat loss can be quantified using 3-D representations of the pellet, which is currently a work in progress. This thermal gradient as shown in FIG. 24 drives the radial cracks to propagate axially until they meet the axial cracks, at which point the pellet is completely fractured.

The formation of significant axial cracks in the experiments, as shown in FIG. 23, is reasonably consistent with the predictions of Yeh et al. As previously mentioned, those simulations employed 2-D planar models and only predict the extent of axial cracking at a given location in the cross section and not the number or location of axial cracks along the axis of the pellet. However, the 2-D planar models did predict axial cracking that penetrated deeply into the pellets. Future 3-D modeling efforts would be necessary to determine whether fracture models predict the number and axial locations of axial cracks.

The time history of the peak temperatures for the three pellets, namely, U4-50, U5-26F, and U5-22C, is shown in FIG. 25. There is a rapid rise in temperature in the inductive heating phase until the pellet gets sufficiently conductive to allow resistive heating. Thereafter, the temperature increases stepwise with the ramp in the current at each power level. The various hold times can also be inferred from FIG. 25, which are also reported in Table 4, see FIG. 15.

To use the results from these experiments for validation of computational models, it is important to ensure that a model accurately represents the thermal conditions prior to cracking. This is challenging because it requires accurately representing both the electrical and the thermal fields, which are affected by boundary conditions and temperature-dependent material properties. To facilitate calibration of numerical models, the temperature profiles along the horizontal and vertical axes for one of the experiments (pellet U5-22C) at a number of points in time during the resistive heating process are shown in FIG. 26. This pellet became sufficiently conductive for resistive heating at 8 s when the temperature reached 550° C., and thereafter, it was heated until 181 s without any evidence of cracking. Cracking was first observed at 182 s, when the peak temperature was about 1600° C. The total heating time of the pellet was 366 s, which included inductive and resistive heating, during which it attained a peak temperature of 2100° C.

Characterization of $UO_2$ Pellets

The cracked pellets from the experiments were further characterized as described here to better understand the microstructural changes and mechanisms driving the formation and propagation of cracks. This characterization included microscopy and measurements of electrical conductivity.

Microscopy

Optical microscopy and scanning electron microscopy (SEM) were performed on as-fabricated and cracked $UO_2$ pellets. Optical microscopy of chemically etched pellets showed distinct grain boundaries and grain sizes in the bulk of the pellets. Each sample was sectioned and then mounted in epoxy, followed by grinding and polishing. Next, it was chemically etched using a solution comprising 10 mL of 95% sulfuric acid ($H_2SO_4$) and 90 mL of 30% hydrogen peroxide ($H_2O_2$). See, K. J. BOWLES and R. E. GHYAS, "Evaluation of Refractory-Metal-Clad Uranium Nitride and Uranium Dioxide Fuel Pins After Irradiation for Times up to 10450 Hours at 990° C.," *NASA TN* 0-7891, *Lewis Research Center, National Aeronautics and Space Administration* (June 1975). The sample was initially etched for 10 s, and then the etching was continued at 20-s increments until the grain boundaries became clearly visible. The optical microscopy and SEM images of an etched pellet are shown in FIGS. 27 and 28, respectively.

Since this pellet was thermally etched during the sintering process, SEM imaging of the as-fabricated pellet surface revealed well-defined grain boundaries, as shown in FIG. 29. The pellet was sintered at 1790° C. for 24 h in Ar-5% $H_2$. The sintering atmosphere is usually reducing, with some percentage of hydrogen ($H_2$) gas for obtaining U0200. The $H_2$ helps to reduce the uranium in order to maintain stoichiometry. The reducing $H_2$ atmosphere removes the excess $O_2$ and maintains a controlled oxygen atmosphere resulting in a chemical oxygen potential of 75 to 125 kJ/mol, which causes thermal etching in the pellet. See, Thermal Etching Process of a Ceramic Under Oxidizing Conditions, U.S. Pat. No. 6,171,511 B1 (Jan. 9, 2001). Generally, thermal etching is very superficial and cannot penetrate to the bulk of the pellet. As a result, we observe the well-defined grains on the as-fabricated surface only, not in the bulk after the pellet has been cut or sectioned. See Hiezel. The chemically etched surface in FIG. 27 shows similar grain structure and grain sizes as the as fabricated surface shown in FIG. 29. These micrographs reveal that the $UO_2$ pellets have a grain size of approximately 14 μm, which is very typical of standard LWR pellets.

Furthermore, the cracked surfaces were examined using SEM, revealing details about the sequence of crack formation and propagation. Images of the cracked surfaces of pellets U5-26F (6 A), U4-50 (4 A), and U5-20C (8 A) after undergoing resistive heating, cooling, and removal from the test stand are shown in FIGS. 30, 31, and 32 respectively. The regions of interest investigated have been marked by black boxes, and the corresponding macroscopic view has been shown.

It was observed in all the SEMs in FIGS. 30-32 that the top left image showing the full face of the pellet reveals that the major primary surface cracks were formed across the diameter of the pellet, generally along the axis between the electrodes. It is difficult to determine whether a single radial crack propagated across the pellet or whether two radial cracks that formed on opposite sides of the pellet joined in the middle.

Regardless, this indicates that the thermally driven hoop stresses were larger near the electrodes than on other portions of the pellet periphery.

The bigger primary surface cracks such as images 1 and 2 in FIGS. 30-32 appear to be very energetic and are a combination of both intergranular and intragranular cracking. The primary cracks were highly symmetrical representing cracking patterns quite typical of brittle materials. On the other hand, secondary surface cracks, for example, image 3 in FIGS. 30 and 31, seem to be less energetic and are mostly intergranular cracking along the grain boundaries. They were likely to be formed at later stages in the cracking process. SEM images 1 and 3 in FIGS. 30 and 31 show the opening at the sites of primary cracks to be larger than that of the secondary cracks. The primary cracks create stress concentration points that ultimately result in additional cracking. The secondary cracks appear to have branched out from the primary cracks as finer, smaller cracks propagating mostly along the grain boundaries. The large primary cracks in FIGS. 30-32 make it evident that macroscale deformation is entirely due to cracking and not due to inelastic deformation. This is expected due to the short duration of the tests.

Fractography is used here to study the shape of the fractured surfaces. SEM images of fractured surfaces for two different pellets are shown in FIG. 33. The red circles in the fractographs in FIG. 33 show faceted features resembling smooth, rounded, protruded surfaces, signifying the regions of grain boundaries. In these areas, cracks tend to propagate easily along the grain boundaries since it is thermodynamically easier for cracks to propagate along predefined surfaces. In fractography, cracks with obtrusive faces projecting out from the surface mark cracking along the grain boundaries.

On the other hand, the yellow circles highlight the flatter features with bandlike structures that mark the intragranular nature of the cracking. Intragranular cracks grow through the grains They resemble cracking that follows smooth symmetrical straight-line paths that cleave the grain itself (see the yellow circles). In the case of intragranular cracking, the cracks must be highly energetic to create surfaces in the grains themselves to propagate through them when grain boundaries are unavailable. Although some of both types of fracture are observed, the fractured surface analysis reveals that the majority of cracking in the fractured surfaces are intergranular or grain boundary cracking.

Electrical Resistivity Measurement

Since the volumetric heating that occurs during resistive heating of $UO_2$ is highly dependent on electrical resistivity, it is important to characterize the electrical resistivity of the actual $UO_2$ pellets studied herein. Samples were examined at ambient room temperature using the four-point probe method. A Cascade Microtech C4S-47/0O four-point probe tip 3402 was used in conjunction with a Gamry Interface 1010E potentiostat 3404. The four-point probe tip was made from tungsten carbide, has inner probe spacing of 1 mm, and requires a loaded weight of 70 to 180 g. A fixture 3406 was built for the four-point probe tip and connected to a sample holder 3408 (see FIG. 34). Also see K. E. METZGER, "Analysis of Pellet Cladding Interaction and Creep of U3Si2 Fuel for Use in Light Water Reactors," Doctoral Dissertation (2016); https://scholarcommons.sc.edu/etd/3811 (current as of Feb. 17, 2021). The sample holder featured an adjustable height stand 3410 to accommodate samples 3412 of various heights. The probe tip was fixed to a polycarbonate beam 3414, allowing for additional weight 3416 during testing. This type of arrangement ensures that the probe tip 3418 and sample 3412 remain perfectly leveled during testing. The $UO_2$ samples were mounted in a nonconductive epoxy and polished prior to resistivity measurements. Calibration was achieved using an undoped intrinsic single-crystal silicon wafer (10×10 mm, 100 μm thick) from University Wafer, Inc., with a quoted resistivity of >3000 Ω·cm.

The electrical resistivity of two $UO_2$ samples from the same batch of pellets that was subjected to resistive heating testing was measured at room temperature and compared against the study conducted by Bates et al. For all tests, a total of 180 g in weight was added to the top of the probe.

This helped maintain proper contact between the probe tips and the sample surface. For an infinitely thin sheet (i.e., a sheet whose thickness is much less than the probe spacing), the sheet's electrical resistivity is related to its thickness t, measured voltage V, and applied current I as per the following equation:

$$\rho = \frac{\pi}{\ln 2} t \frac{V}{I}.$$

Chronoamperometry analysis was performed by using the Gamry potentiostat, applying a constant voltage of 10 V, and measuring the resultant currents. Each test was performed for 30 s. The two samples' current values are tabulated in Table VI, see FIG. 35.

Using the current values from Table VI, see FIG. 35, and constant voltage value of 10V, the electrical resistivity of each sample was calculated. The results are shown in Table VII and graphically compared with each other and with the values indicated by Bates et al. for the same temperature in FIG. 37. It is clear that the resistivity is roughly an order of magnitude higher here than that indicated by Bates et al. One likely explanation for this is that there is a strong observable correlation between resistivity and porosity. Electrical resistivity increases—and conductivity decreases—with increasing porosity in the sample.

The $UO_2$ samples studied by Bates et al. were almost 100% dense, potentially explaining the very high electrical conductivity seen in FIG. 37. There is also a direct dependency of the O/U ratio on the electrical conductivity of $UO_2$. Ishi et al. found that the higher the O/U ratio is, the higher the electrical conductivity is. See, T. ISHII, K. NAITO, and K. OSHIMA, "Electrical Conductivity and Defect Structures in Non-Stoichiometric $UO_{2+x}$," J. Nucl. Mater., 36, 3, 288 (1970); https://doi.org/10.1016/0022-3115(70)90044-9. However, density and porosity are the primary factors affecting the electrical conductivity of $UO_2$, not stoichiometry.

The pellets investigated here for resistivity measurements have a lower density, which explains the significantly higher resistivity values shown in FIG. 37.

CONCLUSION

This disclosure provides experimental efforts for studying temperature-gradient-driven cracking in $UO_2$. The three main objectives of this work are (1) to develop an experimental apparatus that can use resistive heating to replicate the thermal conditions experienced by $UO_2$ pellets under a variety of operating conditions in the reactor, (2) to collect data using this apparatus for the validation of 2-D and 3-D cracking models in fuel performance codes such as BISON, and (3) to characterize as-fabricated and cracked pellets to better understand the mechanisms of cracking and explore basic material properties relevant to this study.

It has been demonstrated here that the experimental setup is able replicate the thermal conditions experienced by fresh fuel in an LWR to a reasonable degree. The combined approach of induction and direct resistance heating created volumetric heating within the pellet, which together with radial heat rejection generated temperature profiles in the pellets reasonably close to those expected in the reactor. The thermal gradients produced with this approach led to cracking that is somewhat representative of that which would occur in fresh fuel in the LWR, with a major difference being that the radial cracks in these experiments were largely concentrated on the path between the electrodes in the experiment while they would be distributed more uniformly around the periphery of fuel in the LWR environment.

The direct resistance heating method is flexible in its ability to replicate different reactor power levels rapidly, which allows it to simulate a variety of transient conditions and characterize the accompanying cracking.

The dual-imaging system has been shown to be highly useful for characterizing both the thermal conditions and fracture initiation and growth during the experiment, providing data that can be directly used for validation of fracture models in fuel performance codes. Crack formation was visible both through the observed discontinuities in the temperature contours provided by the thermal imaging and the observed cracks in the optical images.

Post-test SEM characterization of cracked and fractured surfaces revealed the formation and propagation of primary cracks along grain boundaries. Measurements of electrical resistivity at room temperature were also taken, providing additional data useful for informing computational models of these experiments.

FIG. 38 shows a summary of $UO_2$ tests for the current disclosure. Average radial $\Delta T$ before cracking=202 and 270° C. along the horizontal and vertical lines, respectively. Average radial $\Delta T$ for crack initiation=221 and 164° C. along the horizontal and vertical lines, respectively.

FIG. 39 shows test conditions for various pellets. The tests began with the DC power supply for resistance heating being set at 0.5 A and 120 V, while the pellet was heated via a molybdenum susceptor using induction heating at 200 A. This was done to raise the pellet to a threshold temperature high enough for it to become sufficiently conductive for resistive heating. The electrical conductivity of $UO_2$ increases sharply with increasing temperature. The pellets were found to become sufficiently conductive to produce a measurable voltage drop once they reached an average temperature of about 460° C., which, in all the tests, occurred after less than 10 s of induction heating as shown in Table. Once a voltage drop was detected, the current was quickly increased to 1 A, and then increased stepwise at 0.5 A increments, along with certain hold times, until several different peak currents (e.g., 4 A, 5 A, 6 A, and 8 A) were reached for a given test. Pellets reached different peak temperatures with increasing current; however, the characteristics of the observed cracking did not differ significantly from one test to another.

Various modifications and variations of the described methods, pharmaceutical compositions, and kits of the disclosure will be apparent to those skilled in the art without departing from the scope and spirit of the disclosure.

Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for capturing fracture initiation and growth in fuel pellets comprising:
    employing inductive heating to raise a temperature of at least one fuel pellet;
    after employing inductive heating employing direct resistance heating by, placing electrodes on at least two sides of the at least one fuel pellet to pass current transversely across the at least one fuel pellet;
    after passing current transversely across the at least one fuel pellet, imaging a pellet surface of the at least one fuel pellet to observe crack formation intersecting the pellet surface to capture fracture initiation and growth in the at least one fuel pellet; and
    after imaging the pellet surface of the at least one fuel pellet, generating at least one temperature profile for the at least one fuel pellet via receiving and measuring infrared thermal radiation from the at least one fuel pellet, wherein the infrared thermal radiation is generated by employing the inductive heating to raise the temperature of the at least one fuel pellet.

2. The method of claim 1, wherein the at least one fuel pellet comprises $UO_2$.

3. The method of claim 1, wherein the capture of fracture initiation and growth in the at least one fuel pellet occurs in real time.

4. The method of claim 1, wherein imaging the pellet surface utilizes a dual imaging technique wherein at least one infrared camera captures the at least one fuel pellet's temperature gradient while at least one optical camera system captures physical images of the at least one fuel pellet.

5. The method of claim 1, wherein the imaging is performed in situ with respect to the at least one fuel pellet.

6. The method of claim 1, wherein both intergranular and intragranular cracking are captured via imaging the pellet surface of the at least one fuel pellet.

7. The method of claim 1, further comprising employing fractography to analyze a shape of at least one fracture in the at least one fuel pellet after generating the at least one temperature profile for the at least one fuel pellet.

* * * * *